(12) United States Patent
Sakamoto et al.

(10) Patent No.: US 6,396,229 B1
(45) Date of Patent: May 28, 2002

(54) METHOD OF ESTIMATING A ROTOR POSITION OF SYNCHRONOUS MOTOR, METHOD OF CONTROLLING SYNCHRONOUS MOTOR WITH NO POSITION SENSOR AND A CONTROLLER OF SYNCHRONOUS MOTOR

(75) Inventors: Kiyoshi Sakamoto, Hitachi; Tsunehiro Endou, Hitachiota; Naohiko Takahashi; Haruo Miura, both of Chiyoda; Hiroshi Fujii, Chiba, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/654,086

(22) Filed: Sep. 1, 2000

(30) Foreign Application Priority Data

Mar. 6, 2000 (JP) ........................................ 2000-065714

(51) Int. Cl.$^7$ ................................................ H02P 6/18
(52) U.S. Cl. ......................... 318/439; 318/721; 318/723
(58) Field of Search ................................. 318/138, 254, 318/439, 700, 720–724

(56) References Cited

U.S. PATENT DOCUMENTS

| | | | | |
|---|---|---|---|---|
| 5,903,128 A | * | 5/1999 | Sakakibara et al. | 318/721 |
| 5,994,870 A | * | 11/1999 | Kaneko et al. | 318/798 |
| 6,281,656 B1 | * | 8/2001 | Masaki et al. | 318/700 |

FOREIGN PATENT DOCUMENTS

JP          8-308286          11/1996

OTHER PUBLICATIONS

"Motors Using Reluctance Torque and Control System", *Technical Report of the Institute of Electrical Engineers of Japan*, No. 719, 1999 (in Japanese).

Z. Chen et al., "An Extended E.m.f. Observer for Salient –Pole Brushless DC Motor's Sensorless Control", *National Conference Lecture Papers of the Institute of Electrical Engineers of Japan*, 1999, pp. 4–480 to 4–481, Paper No, 1026 (in Japanese).

H. Watanabe et al., "An Improved Measuring Sustem of Rotor Position Angles of the Sensorless Direct Drive Servomotor", *Proceedings, IECON '91, 1991 International Conference on Industrial Electronics, Control and Instrumentation*, Vol. 1, pp. 165–170, Kobe Japan, Oct. 28–Nov. 1,1991.

A. Consoli et al., "Sensorless Vector and Speed Control of Brushless Motor Drives", *IEEE Transactions on Industrial Electronics*, Vol. 41, No. 1, Feb. 1994, pp. 91–95.

(List continued on next page.)

*Primary Examiner*—Bentsu Ro
(74) *Attorney, Agent, or Firm*—Antonelli, Terry, Stout & Kraus, LLP

(57) ABSTRACT

In a method of accurately estimating the rotor position of a synchronous motor having saliency from observable quantities, a control system for adjusting an output frequency of an inverter on the basis of a value of axis shift of the synchronous motor to operate the motor synchronously with the output frequency is provided with an induced voltage estimating/axis shift operating unit. Currents resulting from conversion of detection currents on a control axis, voltage commands to be inputted to an inverse converter and a speed command are inputted to the operating unit to estimate an induced voltage of the motor 2 and determine the axis shift from a phase of the estimated induced voltage. By using an electrical constant Lq of inductance, a voltage drop across the inductance is determined by the product of a motor speed command and magnitude of motor current. The voltage drop is a virtual quantity that does not depend on the motor rotor position. A vector of the virtual quantity is so introduced as not to change a phase of the original induced voltage.

24 Claims, 9 Drawing Sheets

OTHER PUBLICATIONS

D. Khaburi et al., "A DSP–Based Controller for Sensorless Control of Synchronous Machines", *Proceedings, EPE '97, 7th European Conference on Power Elcetronics and Applications*, Vol. 4, pp.4.547–4.552, Trondheim, Norway, Sep. 8–10, 1997.

Y.–H. Kim et al., "High Performance IPMSM Drives without Rotational Position Sensors Using Reduced–Order EKF", *IEEE Transactions on Energy Conversion*, Vol. 14, No. 4, Dec. 1999, pp. 868–873.

* cited by examiner

METHOD OF ESTIMATING A ROTOR POSITION OF SYNCHRONOUS MOTOR, METHOD OF CONTROLLING SYNCHRONOUS MOTOR WITH NO POSITION SENSOR AND A CONTROLLER OF SYNCHRONOUS MOTOR

BACKGROUND OF THE INVENTION

The present invention relates to synchronous motor control methods and more particularly, to a method of estimating a rotor position of a synchronous motor having saliency and method and system of controlling the synchronous motor with no position sensor (without resort to a position sensor).

To drive a synchronous motor having a magnetic field generated by a permanent magnet, a synchronized operation method for driving the synchronous motor in open loop without detecting the rotation position as in the case of inverter control in induction motors and a brush-less DC motor operation method for operating the synchronous motor in closed loop by using any kind of rotation position detecting means have been employed.

In the case of the latter brush-less DC operation, any kind of rotor position sensor is provided and the number of wiring lines between an inverter and the motor increases as compared to inverter drive of an induction motor. As a result, maintainability and reliability are degraded to restrict the application range and especially, the motor cannot be used in special ambience such as a compressor. To cope with this disadvantage, a position-sensorless technique for estimating a rotation position without using a sensor has been proposed.

The method for use in the conventional position-sensorless technique is classified into two main methods of which one utilizes saliency that makes the winding inductance differ with rotation positions and the other utilizes a voltage of speed electromotive force induced in the motor winding. In the latter, no speed electromotive force is generated during stopping and low-speed operation and hence position estimation is difficult to achieve but during medium/high-speed operation, the latter method can advantageously be applicable to both the salient type and the non-salient type.

As the position-sensorless technique based on the speed electromotive force, there is available a technique described in, for example, The Institute of Electrical Engineers of Japan, Technical Report No. 719, page 17 (prior art 1). In this technique, speed electromotive force in a synchronous motor of non-salient type is determined from a voltage/current-measured value of the motor pursuant to a voltage/current equation and a rotor position as viewed from the stator is estimated.

There is also available a technique disclosed in JP-A-8-308286 (prior art 2). In this technique, in relation to a d-q real rotary coordinate system having d axis representing positions in the direction of magnetic flux of the permanent magnet rotor and q axis 90° leading the d axis in the rotary direction, a dc-qc rotary coordinate system having dc axis representing virtual rotary positions from the control viewpoint and qc axis 90° leading the dc axis in the rotary direction is defined from the control viewpoint. Estimation of a real rotary position takes advantage of the fact that when a difference between d axis current estimated on the basis of a motor model derived from a voltage/current equation on the d-q rotary coordinates and dc axis current on the control axis is calculated, this difference is proportional to an axis shift $\Delta\theta$ of virtual rotary position.

Further, one may refer to a technique disclosed in The Institute of Electrical Engineers of Japan, National Conference lecture papers, 1999, pp4–480, paper No. 1026 (prior art 3). According to this technique, in a circuit equation of a synchronous motor having saliency on the stator coordinates ($\alpha,\beta$ axis), a term specific to the salient-pole machine that depends on both the current and the position is decomposed into a component in a current vector direction and a component in an induced voltage (speed electromotive force) direction, and a term representing a voltage induced by permanent magnet flux and a term representing a voltage induced by reluctance flux are merged to define an expanded induced voltage. Subsequently, an expression for estimating vector components of the expanded induced voltage is derived pursuant to the known minimum dimension observer method and a rotor position of the motor is determined from an estimated expanded induced voltage. The derived estimation expression for the expanded induced voltage uses winding resistance r, inductances Ld and Lq as motor constants and performs an operation by using values of voltage and current on the stator coordinates and an estimated speed of the motor. In addition, to avoid the necessity of a current differential value for the operation, an intermediate variable constructed of the sum of components related to the expanded induced voltage and the current is introduced so that the expression may be reduced so as to estimate the intermediate variable without using the current differential value.

The prior art 1 cannot be applied to the salient-pole machine. This is because in the salient-pole machine, the winding inductance changes with the rotation position and therefore, unless the rotor position is known, the inductance cannot be determined and the magnitude of a voltage drop due to the inductance cannot be determined.

In the prior art 2, a current value on the dc-qc control rotary coordinate system representing the virtual rotary axis is estimated by using the motor model on the d-q rotary coordinates. Accordingly, when the virtual rotary axis shifts from the real rotary position, the position cannot be estimated correctly. Besides, an approximation of sin $\Delta\theta \approx \Delta\theta$ is carried out when deriving an operation expression of axis shift $\Delta\theta$. Consequently, when an actual axis shift is large, the axis shift $\Delta\theta$ cannot be operated correctly. Therefore, the prior art 2 has a disadvantage that it is unsuited for applications in which the motor load changes abruptly or an abrupt accelerating/decelerating operation takes place.

The prior art 3 is based on the stator coordinates ($\alpha\beta$ axis) as described above and hence, the expanded induced voltage about to be estimated is of an AC (alternating current) quantity. Consequently, during high-speed operation of the motor, the expanded induced voltage changes at a higher rate than the speed of estimation pursuant to the estimation expression based on the minimum dimension observer, giving rise to a problem that the rotor position cannot be estimated correctly.

In addition, the estimation expression not using a differential of observed current is employed. The differential of the observed current on the stator coordinates is mainly related to a voltage drop due to inductance, demonstrating that the technique of prior art 3 determines the position without using a voltage drop component due to inductance. Therefore, the estimation expression based on the minimum dimension observer is said to estimate the expanded induced voltage and the voltage drop component due to inductance indistinctively. The voltage drop component increases in proportion to current and accordingly, when a relatively large current flows, the voltage drop component becomes larger than the expanded induced voltage, thus raising a problem that the accuracy of position estimation based on the observer is degraded.

Further, with a recent trend toward miniaturization of motors, the inductance value is very liable to change owing the flux saturation during current increase. When estimating the position, the techniques of prior arts 2 and 3 require two parameters Ld and Lq of inductance in the motor winding. Accordingly, the rotor position must be estimated correctly without being affected by changes in the two inductance parameters Ld and Lq and because of the necessity of correcting the two parameters, the construction becomes complicated.

SUMMARY OF THE INVENTION

The present invention contemplates elimination of the above conventional problems and it is an object of the invention to provide a rotor position estimating method which can correctly estimate the rotor position of a synchronous motor having saliency from the phase of an induced voltage and method and apparatus of controlling the synchronous motor without using a position sensor which can be applied with the estimation method to stably perform a high-speed operation or abrupt load change and abrupt accelerating/decelerating operation.

In the present invention, avoidance of the use of such unobservable quantities and approximate value as in the prior arts 2 and 3 is considered to improve the accuracy of estimation of the rotor position of a synchronous motor having saliency (simply termed a salient-pole machine) from the phase of a voltage induced in the motor. When trying to determine an induced voltage on the basis of the voltage equation of the salient-pole machine, a voltage drop due to an inductance of motor winding depends on the rotor position and therefore cannot be observed without resort to a position sensor or in a position-sensorless fashion.

In the present invention, it is noticed that the intended object can be attained if the phase or an induced voltage can be estimated correctly even with a failure to correctly estimate the magnitude of the induced voltage. Then, in the present invention, a concept of virtual voltage drop by which a voltage drop due to an inductance does not depend on the rotor position is introduced and the virtual voltage drop is used to determine induced voltage while finding the vector relation of the virtual voltage drop in the voltage equation that does not impair the phase of an original induced voltage.

To accomplish the above object, according to the invention, when estimating an induced voltage in a synchronous motor having saliency from a vector difference between a motor applied voltage and voltage drops due to resistance and inductance of the motor winding, the voltage drop due to inductance is determined from a virtual voltage drop representing a quantity that uses a predetermined value as the inductance and is dephased by a predetermined amount from a motor current (Im). Then, from the estimated induced voltage, a phase of the induced voltage is calculated to estimate the rotor position. A vector of the virtual voltage drop is so derived as to prevent the phase of the induced voltage from changing and as to permit a change of the induced voltage to be computed.

The inductance constant of the synchronous motor having saliency is defined by Ld and Lq. Inductance constant Ld is a parameter indicative of the relation between d axis current and magnetic flux $\phi$d on the rotary coordinates (d-q axis) and in the case of permanent magnet type, the direction of flux generated by the magnet is the same as that of the flux $\phi$d due to the d axis current. Inductance constant Lq is a parameter indicative of the relation between q axis current and flux $\phi$q and in the case of permanent magnet type, flux generated by the magnet is orthogonal to the flux $\Phi$q due to the q axis current.

In an embodiment of the invention, the inductance voltage drop has a vector that 90° leading the motor current (Im) and uses the inductance Lq representing a motor electrical constant of the salient-pole machine as the aforementioned predetermined value. Then, the inductance voltage drop is determined from the product of the Lq, the magnitude of the observable motor current and an observable frequency ($\omega$1) of motor applied voltage or motor speed command value ($\omega$r*). Through this, the inductance voltage drop not causing the phase of induced voltage to change can be calculated on the basis of the observable quantities and estimation of the phase of induced voltage can be simplified.

Further, inductance constants Lq and Ld may be used as the aforementioned predetermined value and the inductance voltage drop may be determined by taking a differential component of motor current into account. As will be described later, the constant Ld is used in an operation related to the differential term.

Furthermore, by using other constants than the inductance constants Lq and Ld to calculate the virtual voltage drop or making a predetermined angle other than 90° the leading angle of the virtual voltage drop relative to the motor current, the phase of the original induced voltage can also be estimated as will be described later.

As described above, according to the invention, by introducing the concept of the virtual voltage drop, the phase of induced voltage, that is, the rotor position can be estimated accurately on the basis of the observable quantities. The aforementioned virtual voltage drop is an operation model using the constants for the inductance but since the vector relation is introduced in which the use of the constants does not reflect upon the phase of induced voltage, phase of induced voltage determined in the present invention does not have a value based on the approximation (sin $\Delta\theta \approx \Delta\theta$) in the prior art but can have accurate values over a wide range.

In the method of controlling the synchronous motor without resort to a sensor according to the invention, on the basis of the fact that the phase of induced voltage estimated from the observable quantities as described above indicates an axis shift angle between a virtual rotor position on the control rotary coordinates and an actual unobservable rotor position, the frequency of motor applied voltage is controlled such that the rotation speed of the virtual rotor position is decreased when the axis shift angle has a value indicating that the virtual rotor position leads the actual rotor position in the rotation direction of the rotor and the rotation speed of the virtual rotor position is increased when lagging is indicated.

Alternatively, when the axis shift angle estimated from the phase of induced voltage has a value indicating that the virtual rotor position leads the actual rotor position in the rotation direction of the rotor, a torque command value for the motor is so controlled as to increase the rotation speed of the actual rotor position but to decrease the rotation speed of the actual rotor position when having a value indicating that the virtual rotor position lags the actual rotor position.

In this manner, the axis shift $\Delta\theta$ between the control axis and the real axis is determined directly from the phase of the induced voltage of motor and hence, even when the axis shift increases owing to an abrupt change in load, stable and highly accurate control can be ensured.

Advantageously, in a control method according to the invention, an error compensation value of the axis shift angle is set and the frequency of the motor applied voltage or the torque command value is so controlled as to render the difference between the axis shift angle and the error compensation value zero. Further, setting of the error compensation value is so adjusted as to minimize the motor current under a condition that the rotation speed of the motor and the load on the motor are constant. This can eliminate the influence of ane error of set parameter to realize more accurate control.

Next, the operational principle of the invention inclusive of the procedure of deriving the axis shift $\Delta\theta$ from the voltage equation of salient-pole machine will be described.

Referring now to FIG. 2, there is illustrated an analytical model of a permanent magnet synchronous motor, indicating a stator winding of U phase, V phase and W phase and a permanent magnet rotor. The rotation angle in the figure is indicated by an electrical angle of AC voltage driving the motor. As shown, d axis is established in the flux direction of the permanent magnet rotor and dc axis is established to indicate the virtual rotor position from the control viewpoint. Although not shown, q axis 90° leading the d axis is set up and qc axis 90° leading the dc axis is set up. The rotor coordinates represent a coordinate system having coordinate axes of d axis and q axis. Hereinafter, d-q coordinate axis will be simply referred to as real axis. The virtual rotor coordinates (rotor coordinates from the control viewpoint) represent a coordinate system having coordinate axes of dc axis and qc axis. Hereinafter, dc-qc coordinate axis will be simply called control axis.

The real axis is rotating at a rotary speed of $\omega r$. The control axis is also rotating at a rotary speed of $\omega 1$. Thus, $\omega 1$ represents the rotary speed of the control axis but when the motor is driven externally, it corresponds to a frequency of motor applied voltage. In the real axis rotating at an instantaneous time point, the phase of d axis is indicated by $\theta d$ in relation to a reference of the U phase winding axis of the stator. Similarly, in the control axis, the phase of dc axis is indicated by $\theta dc$. The polarity of phase is defined as positive when the rotation direction of the rotary coordinate axis in FIG. 2 is counterclockwise. An axis shift $\Delta\theta$ between the real axis and the control axis is defined by equation (1).

$$\Delta\theta = \theta_{dc} - \theta_d \quad (1)$$

It has been known that in the rotor coordinates of the permanent magnet synchronous motor having saliency, a voltage equation of equation (2) stands, where r, Ld and Lq are electrical constant parameters representing resistance and inductance of the motor winding and p is a differential operator.

$$\begin{bmatrix} V_d \\ V_q \end{bmatrix} = r \begin{bmatrix} I_d \\ I_q \end{bmatrix} + \begin{bmatrix} -\omega_1 L_q \cdot I_q \\ \omega_1 L_d \cdot I_d \end{bmatrix} + \begin{bmatrix} L_d \cdot pI_d \\ L_q \cdot pI_q \end{bmatrix} + \begin{bmatrix} 0 \\ k_E \omega_r \end{bmatrix} \quad (2)$$

In equation (2), Vd and Vq are d-axis and q-axis components of motor applied voltage V1, and Id and Iq are d-axis and q-axis components of motor current Im. The Vd, Vq, Id and Iq are voltage and current values on the real axis and therefore, in the case of control without resort to position sensor in which positions on the real axis are unknown, they are unobservable quantities. The fourth term on the right side in equation (2), $K_E \cdot \omega r$ represents speed electromotive force generated by rotation of the motor, that is, the magnitude of an induced voltage.

In the case of control without resort to position sensor, frequency $\omega 1$ of the applied voltage V1 is observable but rotation speed $\omega r$ of the rotor is unobservable. Then, equation (2) is reduced to an equation on the virtual rotor coordinates. Since the axis shift between the real axis and the control axis is $\Delta\theta$, voltage and current vectors on the real axis can be expressed by equation (3) in accordance with observable voltages Vdc and Vqc and current values Idc and Iqc on the control axis.

$$\begin{bmatrix} V_d \\ V_q \end{bmatrix} = \begin{bmatrix} \cos\Delta\theta & -\sin\Delta\theta \\ \sin\Delta\theta & \cos\Delta\theta \end{bmatrix} \begin{bmatrix} V_{dc} \\ V_{qc} \end{bmatrix} \begin{bmatrix} I_d \\ I_q \end{bmatrix} = \begin{bmatrix} \cos\Delta\theta & -\sin\Delta\theta \\ \sin\Delta\theta & \cos\Delta\theta \end{bmatrix} \begin{bmatrix} I_{dc} \\ I_{qc} \end{bmatrix} \quad (3)$$

By substituting equation (3) to equation (2), there results equation (4) that expresses a voltage equation on the virtual rotor coordinates.

$$\begin{bmatrix} V_{dc} \\ V_{qc} \end{bmatrix} = r \begin{bmatrix} I_{dc} \\ I_{qc} \end{bmatrix} + \omega_1 \begin{bmatrix} L_{dqc} & -L_{qc} \\ L_{dc} & -L_{dqc} \end{bmatrix} \begin{bmatrix} I_{dc} \\ I_{qc} \end{bmatrix} + \frac{d\Delta\theta}{dt} \begin{bmatrix} -L_{dqc} & -L_{dc} \\ L_{qc} & L_{dqc} \end{bmatrix} \begin{bmatrix} I_{dc} \\ I_{qc} \end{bmatrix} + \begin{bmatrix} L_{dc} & -L_{dqc} \\ -L_{dqc} & L_{qc} \end{bmatrix} \begin{bmatrix} pI_{dc} \\ pI_{qc} \end{bmatrix} + k_E \omega_r \cdot \begin{bmatrix} \sin\Delta\theta \\ \cos\Delta\theta \end{bmatrix} \quad (4)$$

In equation (4), inductances Ldc, Lqc and Ldquc are given by equation (5).

$$\begin{cases} L_{dc} = \frac{L_d + L_q}{2} + \frac{L_d - L_q}{2}\cos(2 \cdot \Delta\theta) \\ L_{qc} = \frac{L_d + L_q}{2} - \frac{L_d - L_q}{2}\cos(2 \cdot \Delta\theta) \\ L_{dqc} = \frac{L_d - L_q}{2}\sin(2 \cdot \Delta\theta) \end{cases} \quad (5)$$

As will be seen from equation (5), values of Ldc, Lqc and Ldqc change depending on the axis shift $\Delta\theta$.

Referring now to FIG. 3, there is illustrated a vector diagram showing the relation between voltages at different portions in the permanent magnet motor having saliency. Motor applied voltage V1 is given by the sum of an induced voltage representing speed electromotive force, a vector Vr of a voltage drop across the resistor and a vector VL of a voltage drop across the inductance. For simplification, it is assumed in the vector diagram that motor currents Id and Iq do not change and are regarded as constant values. This means that a differential term of the third term on the right side in equation (2) or differential terms of the third and fourth terms on the right side in equation (4) are neglected.

Generally, the estimation of magnetic pole position based on speed electromotive force takes advantage of the fact that the phase of the induced voltage of motor occurs in the q axis direction 90° leading the flux axis. Accordingly, by estimating components of the induced voltage vector on the dc-qc coordinates representing the control axis and determining an angle between the vector and the qc axis as shown in FIG. 3, the axis shift $\Delta\theta$ between the control axis and the real axis can be determined. Since the induced voltage term cannot be observed externally, it is estimated usually from an observable quantity. Various methods for estimation have been proposed but essentially, an estimated induced voltage is determined by subtracting the voltage drop vectors Vr and VL across the resistance and inductance from the motor applied voltage V1.

Of the voltage drop vectors necessary for estimation of the induced voltage term, the voltage drop Vr across the resistance can be computed from an observable quantity. The Vr is in phase with the motor current Im and its magnitude is r times the motor current. This relation stands regardless of the coordinate system and in the vector diagram, the Vr and Im are indicated in the same direction. Accordingly, the voltage drop Vr across the resistance can be computed from observable current detection values Idc and Iqc on the dc-qc coordinates.

On the other hand, the voltage drop VL across the inductance cannot be computed if the position of the real axis is unknown. The VL is a vector having, on the real axis, a component of $-\omega 1 \cdot Lq \cdot Iq$ in the d axis direction and a component of $\omega 1 \cdot Ld \cdot Id$ in the q axis direction and for determination of the VL, current values Id and Iq on the real axis are necessary. But, since the current values Id and Iq on the real axis are unobservable, the voltage drop VL across the inductance cannot be computed.

This will be explained by making reference to the voltage equation. In equation (4), the second, third and fourth terms on the right side indicate the voltage drop VL, including the inductance parameters Ldc, Lqc and Ldqc and therefore, the VL cannot be computed unless the value of axis shift $\Delta\theta$ is determined. Since, in the control without resort to position sensor, $\Delta\theta$ cannot be determined, the VL cannot be computed. For example, in the technique of prior art 2, an approximate value of VL is computed by using the inductance value when the axis shift $\Delta\theta$ is zero. But as the axis shift $\Delta\theta$ deviates from the vicinity of zero, the approximation error increases, giving rise to a failure to correctly estimate the induced voltage phase.

Under the circumstances, according to the invention, the concept of virtual voltage drop is admitted to the voltage drop due to the inductance. The virtual voltage drop is a kind of operation model but to prevent the accuracy of the phase of the target induced voltage from being degraded even when operation is conducted by using this operation model, the virtual voltage drop is introduced on condition that (1) the virtual voltage drop VL' can be computed from an observable current quantity, (2) to meet (1) above, the VL' is constructed of a component that is dephased from the current by a predetermined amount, a component that is dephased from the current differential value by a predetermined amount or the sum of the above two components, and (3) the vector relation is held such that the phase of a vector (assumptively, called a virtual induced voltage) obtained by subtracting voltage drop Vr across the resistance and virtual voltage drop VL' from the motor applied voltage V1 (assumptively, called virtual induced voltage) is in phase with the original motor induced voltage. In order for the phase of the virtual induced voltage determined through subtraction to coincide with the phase of the induced voltage, the magnitude of VL' must be determined suitably.

According to the invention, for simplification of operation, the virtual voltage drop VL' is constructed of the sum of a component 90° leading the current phase and a component in phase with the current differential. Through this, the phase of a vector obtained by subtracting the voltage drop Vr across the resistance and the virtual voltage drop VL' coincides with the phase of the original induced voltage. Alternatively, depending on the result of derivation of a calculation equation of the virtual voltage drop VL', only the component 90° leading the current phase may be used as will be described later.

Next, a virtual voltage drop satisfying the conditions as above will be explained. A voltage equation relation similar to that in FIG. 3 is illustrated in a vector diagram of FIG. 4 by using the virtual voltage drop VL'. In the voltage drop VL in FIG. 3, the inductance value for d axis differs from that for q axis but in the virtual voltage drop VL' in FIG. 4, both the inductance values have the same value to satisfy condition (2). Further, to meet condition (3), the inductance value of the q axis component in phase with the induced voltage is changed in the VL'.

This ensures that in the VL', the Id and Iq are multiplied by the same coefficient $\omega 1 \cdot Lq$ and so the phase of VL' 90° leads the observed current Im. Accordingly, with the current observation values Idc and Iqc on the control axis determined, the phase of VL' can be determined as a phase 90° leading the current Im. Since the VL and VL' differ from each other in the q axis direction component, the induced voltage indicated by blanked arrow in FIG. 4 does not differ from that in FIG. 3 in phase but differs in only magnitude. In other words, calculating the voltage drop due to inductance through the use of the constant Lq does not impair information about the phase of the induced voltage. It will be appreciated that the sum of the magnitude of the induced voltage and that of the inductance voltage drop in phase with the induced voltage is the same for FIGS. 3 and 4.

Two components of the virtual voltage drop VL' in FIG. 4 are indicated by unobservable values on the real axis to facilitate comparison with FIG. 3. In FIG. 5, however, the virtual voltage drop VL' in FIG. 4 is indicated by observable values on the control axis. More specifically, in FIG. 5, the virtual voltage drop VL' is indicated by components obtained by multiplying each of the observable current values Idc and Idq by $Lq \cdot \omega 1$.

Next, a procedure for deriving the voltage relation of FIG. 5 using the virtual voltage drop VL' in terms of the voltage equation on the d-q coordinates of the salient-pole machine will be described. Equation (2) expresses the voltage equation on the real axis and the second and third terms on the right side indicate the voltage drop VL across the inductance. These terms will now be separated as indicated by equations (6) and (7).

$$\begin{bmatrix} -\omega_1 L_q I_q \\ \omega_1 L_d I_d \end{bmatrix} = L_q \omega_1 \begin{bmatrix} -I_q \\ I_d \end{bmatrix} + \begin{bmatrix} 0 \\ \omega_1 L_d I_d - \omega_1 L_q I_d \end{bmatrix} \quad (6)$$

$$\begin{bmatrix} L_d \times pI_d \\ L_q \times pI_q \end{bmatrix} = L_d \begin{bmatrix} pI_d \\ pI_q \end{bmatrix} + \begin{bmatrix} 0 \\ L_q \times pI_q - L_d \times pI_q \end{bmatrix} \quad (7)$$

In equation (6), the second term on the right side in equation (2) is divided into a component 90° leading the current phase and an adjusting component. In equation (7), the third term on the right side in equation (2) is divided into a component in phase with the differential quantity of current and an adjusting component.

The first term on the right side in equations (6) and (7) can be said to indicate a voltage drop determined on the assumption that values of inductance differing for d and q axes owing to the saliency are rendered to be constant. But, the inductance value used for the d axis component in the vectors on the left side in equations (6) and (7) is rendered to be constant. This ensures that the adjusting component in the second term on the right side in equations (6) and (7) can have a value on the q axis equal to the component of the induced voltage.

The first terms in equations (6) and (7) are merged to give virtual voltage drop VL' expressed by equation (8).

$$V'_L = L_q \omega_1 \begin{bmatrix} -I_q \\ I_d \end{bmatrix} + L_d \begin{bmatrix} pI_d \\ pI_q \end{bmatrix} \quad (8)$$

To sum up, the virtual voltage drop across the inductance is a voltage drop computed as below. Namely, the term proportional to rotation speed ω1 is Fat calculated by using the inductance Lq. The term proportional to current changes dId/dt and dIq/dt are calculated by using the inductance Ld.

Next, equations (6) and (7) are substituted to equation (2), so that the voltage equation of the salient-pole machine on the real axis when the virtual voltage drop is used can be expressed by equation (9).

$$\begin{bmatrix} V_d \\ V_q \end{bmatrix} = r \begin{bmatrix} I_d \\ I_q \end{bmatrix} + \omega_1 L_q \begin{bmatrix} -I_q \\ I_d \end{bmatrix} + L_d \begin{bmatrix} pI_d \\ pI_q \end{bmatrix} + \begin{bmatrix} 0 \\ k_E \omega_r + \omega_1 (L_d - L_q) \cdot I_d + (L_q - L_d) \cdot pI_q \end{bmatrix} \quad (9)$$

The first to third terms on the right side in equation (9) indicate a voltage drop across the resistance and a virtual voltage drop across the inductance.

The fourth term on the right side in equation (9) can be considered as an induced voltage component when the virtual voltage drop is used. This induced voltage differs, in magnitude, from the induced voltage in equation (2) but its component is trapped on the q axis and its d axis component is zero, demonstrating the former voltage is quite in phase with the latter voltage. In the fourth term, kE·ωr represents speed electromotive force generated by the permanent magnet field, ω1·(Ld−Lq) Id represents an induced voltage component related to reluctance torque, and (Lq−Ld) pIq represents an induced voltage due to a change in q axis current.

Equation (9) is reduced to a voltage equation on the control axis. Firstly, equation (3) is substituted to equation (9) and there results equation (10).

$$\begin{bmatrix} \cos\Delta\theta & -\sin\Delta\theta \\ \sin\Delta\theta & \cos\Delta\theta \end{bmatrix} \begin{bmatrix} V_{dc} \\ V_{qc} \end{bmatrix} = r \begin{bmatrix} \cos\Delta\theta & -\sin\Delta\theta \\ \sin\Delta\theta & \cos\Delta\theta \end{bmatrix} \begin{bmatrix} I_{dc} \\ I_{qc} \end{bmatrix} + L_d p \begin{bmatrix} \cos\Delta\theta & -\sin\Delta\theta \\ \sin\Delta\theta & \cos\Delta\theta \end{bmatrix} \begin{bmatrix} I_{dc} \\ I_{qc} \end{bmatrix} + \omega_1 L_q \begin{bmatrix} 0 & -1 \\ 1 & 0 \end{bmatrix} \begin{bmatrix} \cos\Delta\theta & -\sin\Delta\theta \\ \sin\Delta\theta & \cos\Delta\theta \end{bmatrix} \begin{bmatrix} I_{dc} \\ I_{qc} \end{bmatrix} + \begin{bmatrix} 0 \\ k_E \omega_r + \omega_1 (L_d - L_q) \cdot I_d + (L_q - L_d) \cdot pI_q \end{bmatrix} \quad (10)$$

Equation (10) is reduced, so that the voltage equation of the salient-pole machine on the control axis when the virtual voltage drop is used can eventually be expressed by equation (11).

$$\begin{bmatrix} V_{dc} \\ V_{qc} \end{bmatrix} = r \begin{bmatrix} I_{dc} \\ I_{qc} \end{bmatrix} + L_d \begin{bmatrix} \frac{dI_{dc}}{dt} \\ \frac{dI_{qc}}{dt} \end{bmatrix} + \left( \omega_1 L_q + L_d \frac{d\Delta\theta}{dt} \right) \cdot \begin{bmatrix} 0 & -1 \\ 1 & 0 \end{bmatrix} \begin{bmatrix} I_{dc} \\ I_{qc} \end{bmatrix} +$$

$$\{k_E \omega_r + \omega_1 (L_d - L_q) \cdot I_d + (L_q - L_d) \cdot pI_q\} \cdot \begin{bmatrix} \sin\Delta\theta \\ \cos\Delta\theta \end{bmatrix} \quad (11)$$

An equation for deriving Δθ is derived from equation (11). Firstly, induced voltage terms in equation (11) are put together to obtain equation (12), from which equation (13) indicative of axis shift Δθ between the control axis and the real axis is obtained.

$$\{k_E \omega_r + \omega_1 (L_d - L_q) \cdot I_d + (L_q - L_d) \cdot pI_q\} \cdot \begin{bmatrix} \sin\Delta\theta \\ \cos\Delta\theta \end{bmatrix} = \begin{bmatrix} V_{dc} \\ V_{qc} \end{bmatrix} - r \begin{bmatrix} I_{dc} \\ I_{qc} \end{bmatrix} - L_d \begin{bmatrix} \frac{dI_{dc}}{dt} \\ \frac{dI_{qc}}{dt} \end{bmatrix} - \left( \omega_1 L_q + L_d \frac{d\Delta\theta}{dt} \right) \cdot \begin{bmatrix} 0 & -1 \\ 1 & 0 \end{bmatrix} \begin{bmatrix} I_{dc} \\ I_{qc} \end{bmatrix} \quad (12)$$

$$\Delta\theta = \tan^{-1} \left[ \frac{V_{dc} - r \cdot I_{dc} - L_d \frac{dI_{dc}}{dt} + \left( \omega_1 L_q + L_d \frac{d\Delta\theta}{dt} \right) \cdot I_{qc}}{V_{qc} - r \cdot I_{qc} - L_d \frac{dI_{qc}}{dt} - \left( \omega_1 L_q + L_d \frac{d\Delta\theta}{dt} \right) \cdot I_{dc}} \right] \quad (13)$$

As described above, as a result of the reduction of equation (2) indicative of the voltage equation of the salient-pole machine, equation 13 indicative of the axis shift Δθ between the control axis and the real axis can be obtained through the voltage equation using the virtual voltage drop. In this procedure of derivation, the approximation of sin Δθ≈Δθ is not carried out and besides the inductance value is not approximated. Accordingly, equation (13) stands in any operation state. For example, even in the case where the control axis and the real axis rotate asynchronously with each other, this equation stands.

On the right side in equation (13), only a differential of Δθ is unobservable. Accordingly, an estimation equation of the axis shift Δθ usable for the rotor position estimation in the control without resort to position sensor is derived as will be described below.

Since the axis shift Δθ is defined by equation (1), its differential can be expressed by the difference between real axis speed and control axis speed as indicated by equation (14).

$$\frac{d\Delta\theta}{dt} = \frac{d}{dt}(\theta_{dc} - \theta_d) = \omega_1 - \omega_r \quad (14)$$

When the permanent magnet synchronous motor is driven without undergoing step-out, values of the real axis speed ωr and control axis speed ω1 are close to each other. Consequently, coefficients for Idc and Iqc in equation (13) can be approximated as indicated by equation (15) and an axis shift estimation equation can be given by equation (16). Normal motor operation is so controlled as not to undergo step-out and the approximation pursuant to equation 15 does not degrade the accuracy of practical use.

$$\omega_1 L_q + L_d \frac{d\Delta\theta}{dt} = \omega_1 L_q + (\omega_1 - \omega_r) L_d = \omega_1 L_q \quad (15)$$

$$\Delta\theta = \tan^{-1} \left[ \frac{V_{dc} - r \cdot I_{dc} - L_d \frac{dI_{dc}}{dt} + \omega_1 L_q \cdot I_{qc}}{V_{qc} - r \cdot I_{qc} - L_d \frac{dI_{qc}}{dt} - \omega_1 L_q \cdot I_{qc}} \right] \quad (16)$$

According to equation (16), the phase angle of the induced voltage in the salient-pole machine, that is, the axis shift angle Δθ can be estimated from the observable values without depending on the position of the control axis and therefore, the rotor position can be estimated without resort to position sensor in accordance with teachings of the invention. Through the control without resort to position sensor in the salient-pole machine using $\Delta\theta$, stable control free from step-out can be implemented even in a high-speed operation at several of ten thousands of rpm and an operation in which a large axis shift occurs, for example, abrupt load change operation or abrupt accelerating/decelerating operation.

Further, when the permanent magnet synchronous motor is driven without undergoing step-out, differentials of currents Idc and Iqc converted to values on the rotary coordinate system represent a change in magnitude Im (peak value) of motor current and a change in phase of the motor current. This can be proven by substituting iu=Im·cos($\theta$dc+$\pi$/2+$\phi$c) and iw=Im·cos($\theta$dc−4$\pi$/3+$\pi$/2+$\phi$c) to phase currents representing detection currents to equation (24) to be described later and by differentiating Idc and Iqc (where $\phi$c represents the phase of current).

Incidentally, under a condition that the motor speed and the load are constant, the changes in magnitude and phase of the motor current are small and hence, the differential terms of currents Idc and Iqc can be regarded as zero. Then, on the assumption that the differential terms of currents Idc and Iqc can be neglected, a further simplified axis shift estimation equation can be given by equation (17).

$$\Delta\theta = \tan^{-1}\left[\frac{V_{dc} - r \cdot I_{dc} + \omega_1 L_q \cdot I_{qc}}{V_{qc} - r \cdot I_{qc} - \omega_1 L_q \cdot I_{dc}}\right] \quad (17)$$

In equation (17), the necessary parameter of inductance is Lq alone and the voltage relation is identical to the vector diagram of FIG. 5. When taking the influence of the parameter error upon the axis shift estimated value into consideration, it is preferable that the number of parameters used in the estimation equation be as small as possible. Accordingly, the method of estimating the axis shift $\Delta\theta$ by using equation (17) is superior to the prior arts 2 and 3 from the standpoint of robustness.

By using the constant Lq for calculation of the virtual voltage drop VL' across the inductance, equation (17) is derived from the vector relation indicating that the phase of VL' 90° leads the motor current Im and the phase of the induced voltage can be estimated through simplified calculation. But, even with a virtual voltage drop VL' determined by using a constant other than Lq and a phase other than 90°, the phase of the original induced voltage can be estimated though slightly complicated calculation.

When Lq' different from Lq is used for calculation of the virtual voltage drop VL', a vector of VL' does not satisfy the relation in FIG. 4 or 5 and the phase of an estimated induced voltage shifts from the original phase. But, if a difference $\Delta$lq between Lq and Lq' is known, then the magnitude of d axis component of the estimated induced voltage will become "$\omega$1·$\Delta$Lq·Iq and the magnitude of its q axis component will become "KE·$\omega$r+$\omega$1(Ld−Lq') Id", thereby ensuring that the phase shift of the estimated induced voltage can be determined through computation. Accordingly, even when an arbitrary parameter value Lq' is used for computation of the inductance voltage drop, the phase of the original induced voltage can be estimated.

If the phase of VL' is selected to have a value other than 90°, the phase of the estimated induced voltage shifts from that of the original induced voltage. But when the selected phase and the phase of the motor current are known, the phase shift of the estimated induced voltage can be determined through computation. Accordingly, even when a vector of the virtual voltage drop across the inductance is selected to be different from that 90° leading the motor current, the phase of the original induced voltage can be estimated when the phase shift is taken into consideration.

Next, another derivation of axis shift estimation equation will be described. In the foregoing, the axis shift $\Delta\theta$ expressed by equation 13 is derived from the voltage and current amounts on the control axis but even if the observation coordinate system changes, the axis shift can be determined similarly. In the following, derivation of an estimation equation of axis shift $\Delta\theta$ on a coordinate system referenced to the current axis of the motor will be described.

Referring to FIG. 6, a vector diagram therein is illustrated on the same condition as that for FIGS. 3 and 4 while being referenced to the current axis. It will be appreciated that the phase of current axis as viewed from the qc axis is indicated by $\phi$c and the phase of motor applied voltage V1 as viewed from the current axis is $\phi$v. The phase of current axis as viewed from the q axis is $\phi$m. A relation of $\phi$m=$\phi$c+$\Delta\theta$ stands between $\psi$m and $\psi$c. It will be appreciated that $\psi$c and $\psi$v are observable quantities but $\psi$m is an unobservable quantity.

When the current axis is selected as a reference (criterion) for the observation coordinates, a motor applied voltage vector and a motor current vector are expressed by equation (18).

$$\text{motor applied voltage vector } V1 = \begin{bmatrix} -V_1 \sin\phi_v \\ V_1 \cos\phi_v \end{bmatrix} \quad (18)$$

$$\text{motor current vector } Im = \begin{bmatrix} 0 \\ Im \end{bmatrix}$$

The vector quantity in equation (18) indicates a component orthogonal to the current direction and a component in the same direction as the current direction. In other words, voltage V1 has a voltage component of −V1·sin $\phi$v orthogonal to current and a voltage component of V1·cos $\phi$v in the same direction as the current direction. Similarly, the current has an orthogonal component that is zero and a component in the same direction that has a magnitude of Im.

On the other hand, voltage drop Vr across the resistance is in phase with the current, having a component of zero orthogonal to the current and a voltage component of r·Im in the same direction as the current. Virtual voltage drop VL' across the inductance 90° leads the current, having a component of "−Lq·$\omega$1·Im" orthogonal to the current and a voltage component of zero in the same direction as the current.

As described above, in the induced voltage referenced to the current axis, its component orthogonal to the current is determined as "−V1·sin $\phi$v−Lq·$\omega$1·Im" and its component in the same direction as the current is determined as "V1·cos $\phi$v−r·Im". Accordingly, by using these values, the unobservable $\phi$m can be determined.

Next, a voltage equation referenced to the current axis will be derived and an equation indicative of the axis shift $\Delta\theta$ will be derived from the voltage equation. Voltage and current vectors on the real axis can be computed from quantities in equation (18) referenced to the current axis pursuant to equation (19).

$$\begin{bmatrix} V_d \\ V_q \end{bmatrix} = \begin{bmatrix} \cos(\Delta\theta + \phi_c) & -\sin(\Delta\theta + \phi_c) \\ \sin(\Delta\theta + \phi_c) & \cos(\Delta\theta + \phi_c) \end{bmatrix} \begin{bmatrix} -V_1 \sin\phi_v \\ V_1 \cos\phi_v \end{bmatrix} \quad (19)$$

-continued $$\begin{bmatrix} I_d \\ I_q \end{bmatrix} = \begin{bmatrix} \cos(\Delta\theta + \phi_c) & -\sin(\Delta\theta + \phi_c) \\ \sin(\Delta\theta + \phi_c) & \cos(\Delta\theta + \phi_c) \end{bmatrix} \begin{bmatrix} 0 \\ I_m \end{bmatrix}$$

Equation (19) is substituted to equation (9) indicative of the voltage equation of the salient-pole machine on the real axis when the virtual voltage drop is used and there results equation (20).

$$\begin{bmatrix} -V_1\sin\phi_v \\ V_1\cos\phi_v \end{bmatrix} = \tag{20}$$

$$r\begin{bmatrix} 0 \\ I_m \end{bmatrix} + L_d\begin{bmatrix} 0 \\ \frac{dI_m}{dt} \end{bmatrix} + \begin{bmatrix} -\omega_1 L_q - L_d\frac{d\phi_c}{dt} - L_d\frac{d\Delta\theta}{dt} \\ 0 \end{bmatrix} \cdot I_m +$$

$$\{k_E\omega_r + \omega_r(L_d - L_q)\cdot I_d + (L_q - L_d)\cdot pI_q\}\cdot \begin{bmatrix} \sin\phi_m \\ \cos\phi_m \end{bmatrix}$$

The fourth term on the right side in equation (20) contains phase information φm of induced voltage observed on the current axis. The fourth term on the right side is arranged to solve equation (20) for φm, thus obtaining equation (21).

$$\phi_m = \tan^{-1}\left[-\frac{V_1\sin\phi_v - \left\{\omega_1 L_q + L_d\frac{d\phi_c}{dt} + L_d\frac{d\Delta\theta}{dt}\right\}\cdot I_m}{V_1\cos\phi_v - r\cdot I_m - L_d\frac{dI_m}{dt}}\right] \tag{21}$$

Here, since Δθ=φm−φc stands, the axis shift Δθ can be expressed by equation (22).

$$\Delta\theta = \tan^{-1}\left[-\frac{V_1\sin\phi_v - \left\{\omega_1 L_q + L_d\frac{d\phi_c}{dt} + L_d\frac{d\Delta\theta}{dt}\right\}\cdot I_m}{V_1\cos\phi_v - r\cdot I_m - L_d\frac{dI_m}{dt}}\right] \tag{22}$$

On the right side in equation (9), the magnitude V1 and phase φv of the motor voltage, the magnitude Im and phase φc of the current and rotation speed ω1 of the control coordinate axis are observable quantities. By performing approximation similar to that used when equations (16) and (17) are obtained, an estimation equation of axis shift Δθ when the current axis is used as an observation system can be given by equation (23).

$$\Delta\theta = \tan^{-1}\left[-\frac{V_1\sin\phi_v - \omega_1 L_q \cdot I_m}{V_1\cos\phi_v - r\cdot I_m}\right] - \phi_c \tag{23}$$

According to equation (23), the axis shift angle Δθ of the salient-pole machine can be estimated correctly from the observable values independently of the position of the control axis and therefore, the rotor position can be estimated without resort to position sensor in accordance with the invention. Like equation (17), equation (23) needs only Lq as the parameter of inductance and so high robustness can also be ensured.

It should be understood that as inverse function of tangent used in each of the equations (13), (16), (17), (21), (22) and (23), an extension function in which the output range is extended to −π~π (rad) is used in consideration of the sign of denominator and numerator serving as inputs to the function. Unless especially noted, the inverse function of tangent used in the present invention is the extended function as described above.

The invention has been described by making reference to the case where the rotation direction of the motor rotor is forward but in the case of inverse or backward rotation direction, by considering that the direction of speed electromotive force is changed from that during forward operation and the sign of the denominator and numerator of the tangent inverse function for determining the axis shift Δθ is changed, the axis shift Δθ can be determined similarly.

As described above, according to the invention, the axis shift Δθ can be estimated from the control system by using the observable quantities. By using the estimated value of axis shift Δθ thus obtained, the permanent magnet synchronous motor is controlled without resort to position sensor in accordance with a method to be described below.

In a first method, frequency ω1 of an AC voltage applied to the motor is modified on the basis of the thus obtained estimation value of axis shift Δθ such that Δθ becomes zero. By controlling the frequency in this manner, the virtual rotary axis can be so controlled as to follow the rotor axis of the motor. In a second method, a torque command value of the motor is modified on the basis of the thus obtained estimated value of axis shift Δθ such that Δθ becomes zero. By this method, the rotor axis of the motor can be so controlled as to follow rotation of the control axis.

Incidentally, the estimation equation of axis shift Eθ expressed by the aforementioned equation (16), (17) or (23) can estimate Δθ correctly when the used parameters coincide with the actual values. But, generally, the parameter set value contains an error and deviates from the actual value. As a result, an error in the estimated value of axis shift Δθ takes place owing to the parameter error.

For example, in equation (17), the parameter values necessary for estimating the axis shift Δθ are resistance r and inductance Lq. In the event that a setting value of Lq is larger than an actual value, the virtual voltage drop VL' in FIG. 4 increases, with the result that the phase of the estimated induced voltage lags a true value of the induced voltage indicated by white blank arrow. Similarly, in the event that the resistance r is larger, the voltage drop Vr in FIG. 4 increases, so that the phase of the estimated induced voltage leads a true value of the induced voltage indicated by white blank arrow.

As described above, the influence of the parameter error occurs in the form of a steady error in the estimated value of axis shift Δθ. Actually, a plurality of parameter errors affect each other to determine an eventual error in axis shift Δθ.

Because of the error as above, the phase of the control axis cannot coincide with the real axis and a steady axis shift Δθe remains. Under this condition, a current conforming to the command value does not flow on the real axis and a current component related to torque generation decreases. As a result, generated torque decreases to cause the speed of rotor to decrease. At that time, the control system without resort to position sensor operates to increase the motor current so as to prevent the speed from decreasing. Eventually, when the steady axis shift Δθe occurs, the motor current increases.

Conversely, this demonstrates that when the phases of the real axis and control axis coincide with each other, the magnitude of motor current is minimized. By taking advantage of this phenomenon, the estimation error Δθe is corrected according to the invention as will be described below.

For correction of the estimation error Δθe, an axis shift error compensation value Δθ* is introduced and frequency ω1 of an AC voltage applied to the motor is modified such that Δθ*−Δθ becomes zero. Besides, the torque command value of the motor is modified such that Δθ*−Δθ becomes zero. An initial value of zero is substituted to the axis shift error compensation value Δθ* and the Δθ* is changed slightly to minimize the motor current under a condition that the rotation speed and load of the motor are constant and remain unchangeable. As a result, the error compensation value Δθ* can eventually approach, as closely as possible, the steady error Δθe in the axis shift estimation, thereby alleviating the influence of the estimation error Δθe.

According to the invention, the phase of the induced voltage of the salient-pole synchronous motor can be estimated from observable values independently of the rotor position and therefore, the rotor position can be acquired with high accuracy without resort to position sensor to advantage.

Through this, even when a large axis shift occurs during a high-speed operation or an abrupt change or abrupt accelerating/decelerating operation, an excellent position-sensorless system of synchronous motor that is stable and free from step-out can be provided.

Further, according to the invention, the influence of the parameter error contained in the operation result of axis shift Δθ can be compensated and therefore, an excellent position-sensorless system of synchronous motor that can be freed from step-out even when the parameter error is large can be provided.

DESCRIPTION OF THE EMBODIMENTS

Embodiments of the present invention will be described by making reference to FIGS. 1 to 12 in the accompanying drawings.

Figure 1:
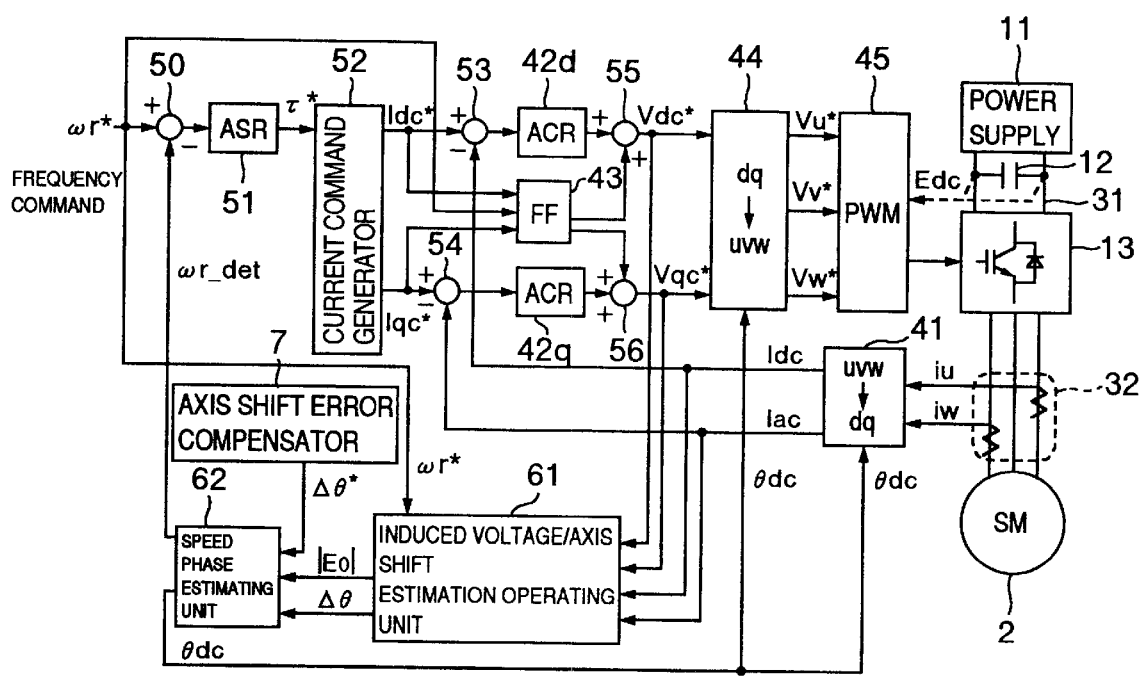
FIG. 1 is a diagram showing the overall construction of a control system for implementing a method of controlling a synchronous motor without resort to position sensor according to an embodiment of the invention.
Figure 2:
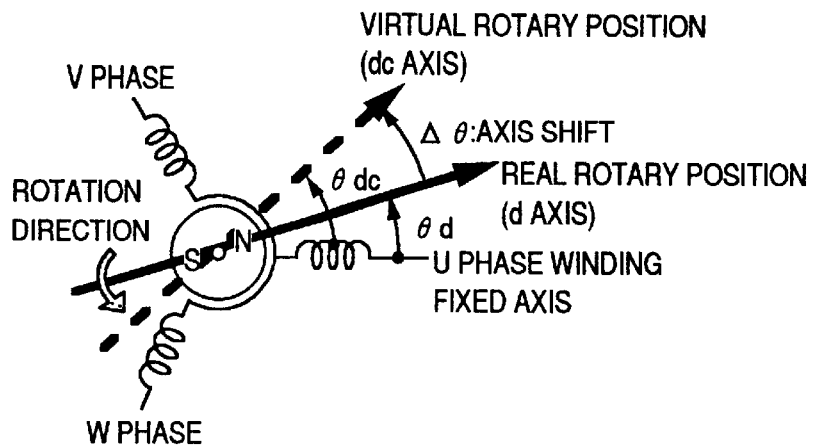
FIG. 2 is an analytical diagram showing the relation between d-q rotary coordinates and dc-qc control rotary coordinates in a permanent magnet synchronous motor.
Figure 3:
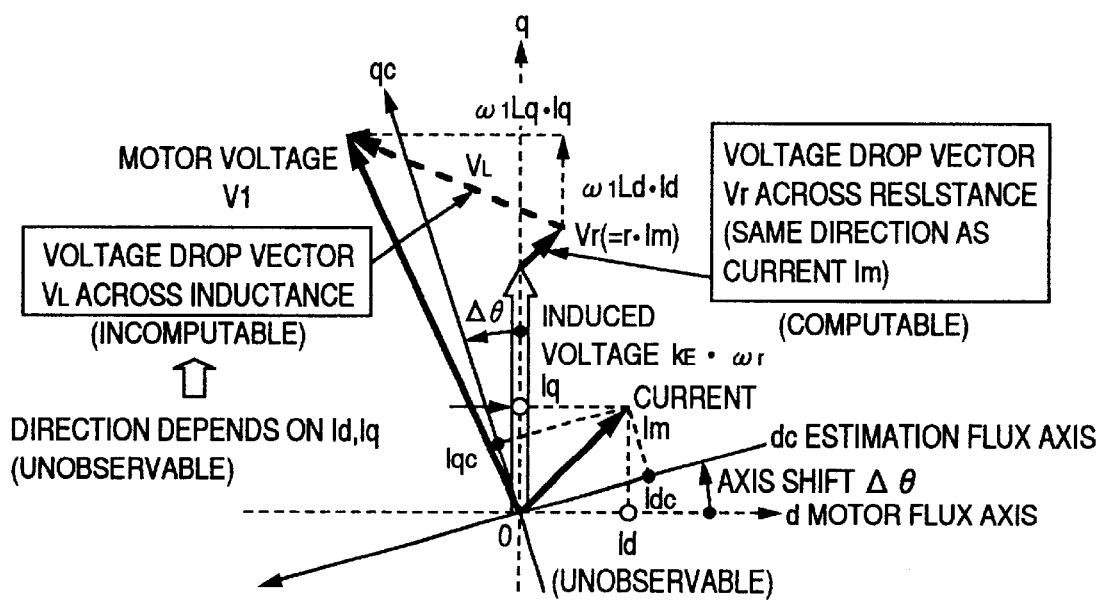
FIG. 3 is a vector diagram showing the relation between voltages in a rotating salient type synchronous motor by using the control axis as a reference.
Figure 4:
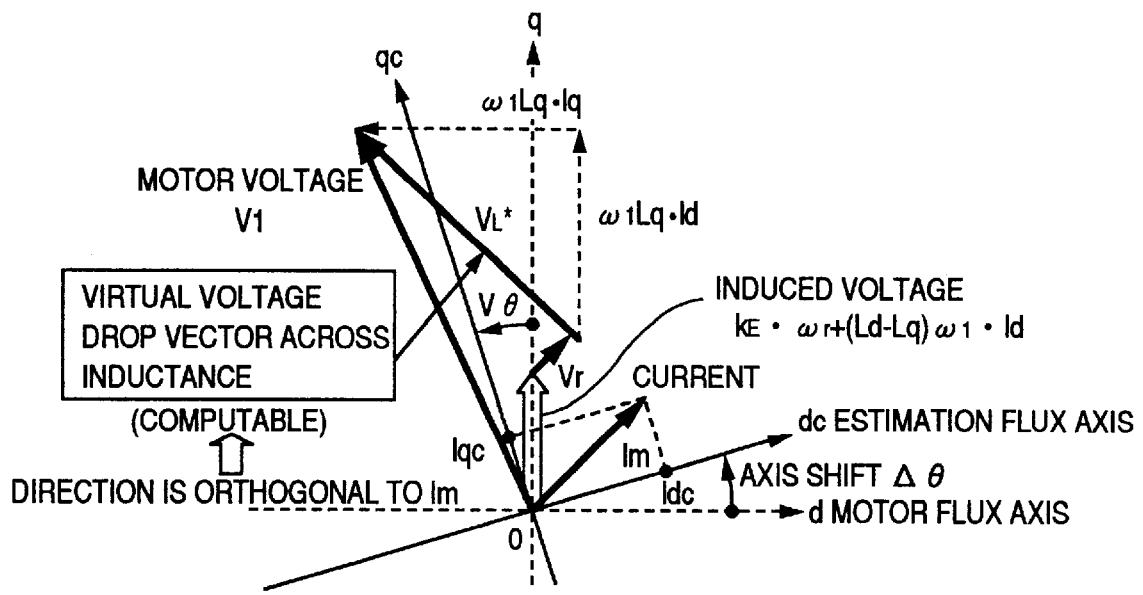
FIG. 4 is a vector diagram introducing the concept of virtual voltage drop to the vector diagram of FIG. 3.
Figure 5:
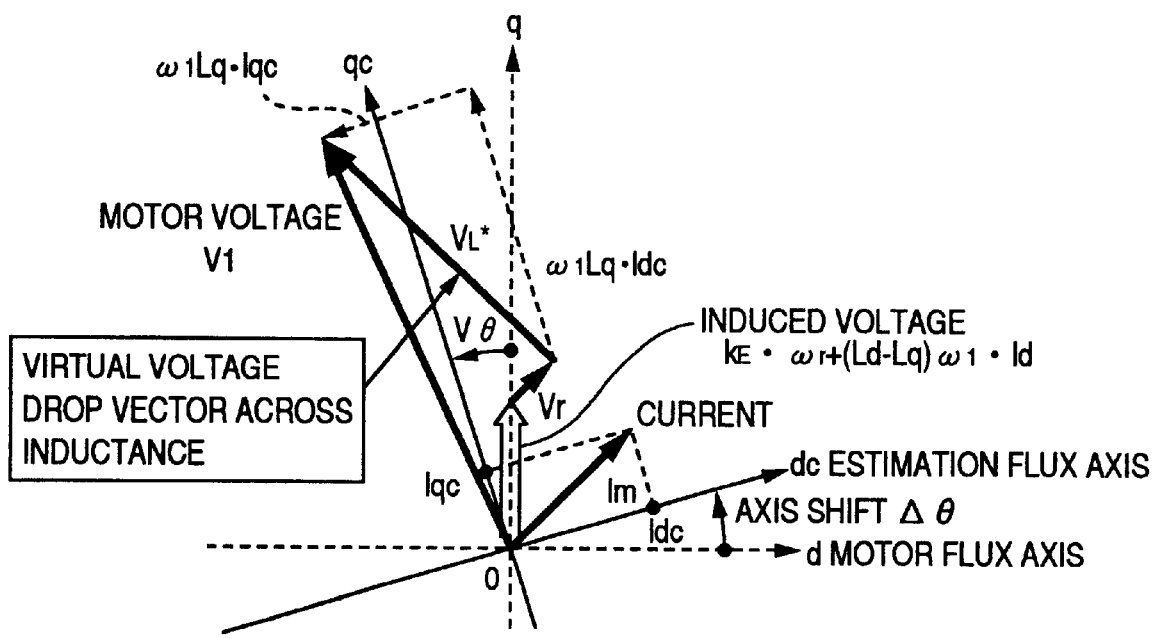
FIG. 5 is a vector diagram showing a virtual voltage drop in the voltage relation in FIG. 4 by using the control axis as a reference.
Figure 6:
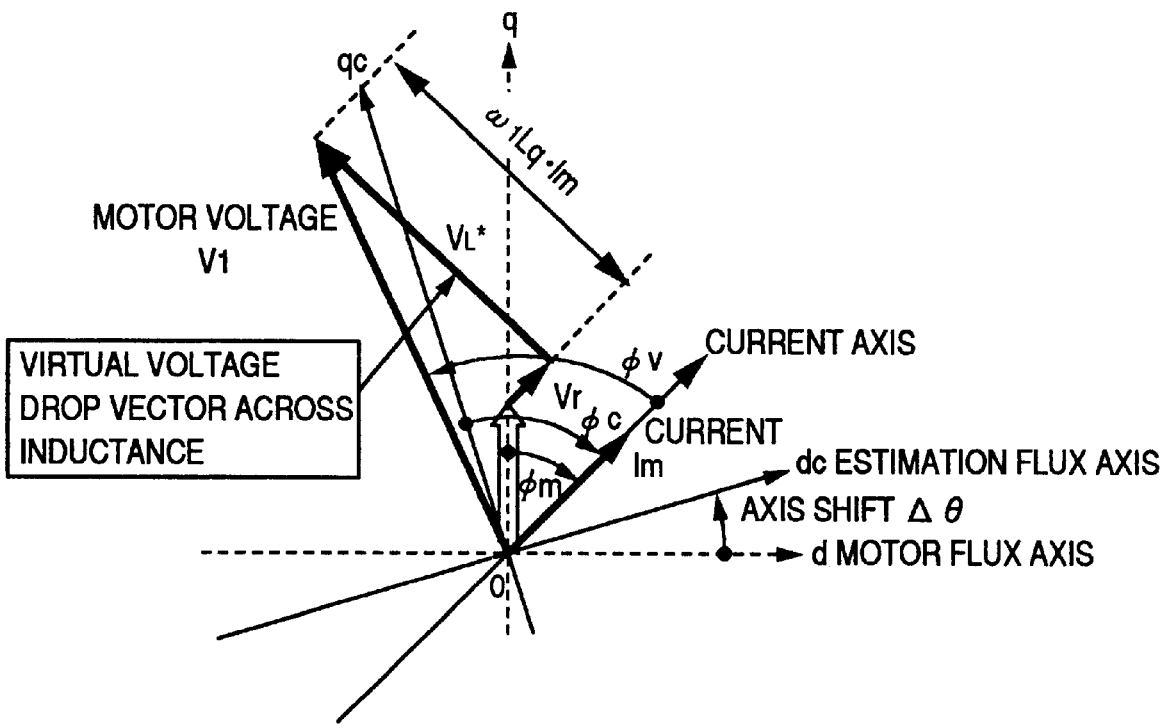
FIG. 6 is a vector diagram showing the voltage relation similar to that in FIG. 4 by using the current axis as a reference.

Referring first to FIG. 1, the whole of a control system for implementing control of a synchronous motor without resort to position sensor according to an embodiment of the invention is constructed as shown therein. A power supply 11 generates a DC voltage Edc and charges a smoothing capacitor 12. The DC voltage Edc is converted by an inverter 13 into a three-phase alternating current of variable voltage and variable frequency which in turn is applied to a synchronous motor 2. A voltage detector 31 detects the DC voltage Edc necessary for controlling a voltage applied to the motor. A motor current detector detects a motor current necessary for position-sensorless control (control without resort to position sensor).

A coordinate converter 41 responds to motor currents iu and iw detected by the motor current detector 32 to perform coordinate conversion for these currents on the basis of a phase θdc of a virtual rotor position dc axis so as to deliver dc axis current Idc and qc axis current Iqc on a virtual rotary coordinates dc-qc coordinate system set up from the control viewpoint. The currents Idc and Iqc are observable values (observation values) converted from the detected motor currents iu and iw and will be hereinafter called observation currents.

The observation current Idc is compared with a d axis current command value Idc* delivered out of a current command generator 52 to compute a current error. A d axis current controller 42d responds to the current error to control the Idc to cause it to follow the command value. Similarly, the observation current Iqc is compared with a current command value Iqc* delivered out of the current command generator 52 to calculate a current error. A q axis current controller 42q responds to the current error to control the Iqc to cause it to follow the command value.

A current feed-forward compensator 43 is a feed-forward compensation device used to improve the current responsibility and to prevent interference between the d axis and q axis current control systems. Signals delivered out of-the d axis current controller 42d, q axis current controller 42q and current feed-forward compensator unit 43 are used for computation of d axis voltage command Vdc* and q axis voltage command Vqc*.

Responsive to the voltage commands Vdc* and Vqc*, an inverse converter 44 performs inverse conversion on the basis of the phase θdc of the virtual rotor position dc axis to prepare three-phase voltage commands Vu*, Vv* and Vw*. On the basis of the thus prepared three-phase voltage commands, a pulse width modulator 45 prepares a drive signal subjected to well-known pulse width modulation (PWM) and the drive signal controls semiconductor switching elements of the inverter 13 through a drive circuit.

Responsive to a speed command ωr* and an estimation speed ωr_det, a speed controller 51 prepares a torque command τ*. From a value of the torque command τ*, a current command generator 52 prepares the d axis current command Idc* and q axis current command Iqc*. The estimated speed ωr_det is obtained by removing a high-frequency change component from an inverter output frequency ω1 representing a rotation speed of the control axis and corresponds to a detection speed in a control system having a sensor. The inverter output frequency ω1 is a frequency of motor applied voltage and by integrating ω1, the rotor position (virtual rotor position) θdc on the control axis can be obtained.

In the appended claims, the components 50 to 52 are merged so as to be called a current command generator and the components 42d, 42q, 43 to 44 and 53 to 55 are merged so as to be called a voltage command operating unit.

As will be described later, an induced voltage/axis shift estimation operating unit 61 featuring the present embodiment estimates an induced voltage of the synchronous motor 2 from values of the voltage commands Vdc* and Vqc*, the detection currents Idc and Iqc and the speed command ωr* serving as rotation speed information. Then, an axis shift estimation value Δθ is computed from the phase of the estimated induced voltage and is delivered. Further, the magnitude |E0| of the induced voltage is delivered.

In respect of the estimated axis shift Δθ, an axis error compensator 7 prepares a compensation quantity Δθ* for compensating the influence of the above-described parameter error. A speed phase estimating unit 62 determines a frequency ω1 of the motor applied voltage from the axis shift Δθ and the axis shift error compensating value Δθ* delivered out of the axis shift error compensator 7, and computes the detection speed ωr_det and virtual axis phase (virtual rotor position) θdc from ω1 so as to deliver them. In speed control in the speed controller 51, the ωr_det is used as a detection speed of the motor. On the other hand, the θdc is used when conversion is carried out in the coordinate converter 41 and inverter 44.

Figure 7:
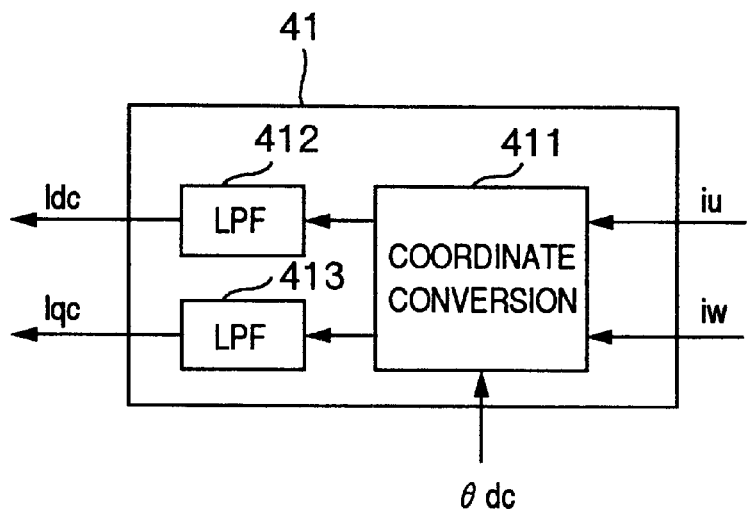
FIG. 7 is a block diagram showing the contents of computation in a coordinate converter 41.
Figure 8:
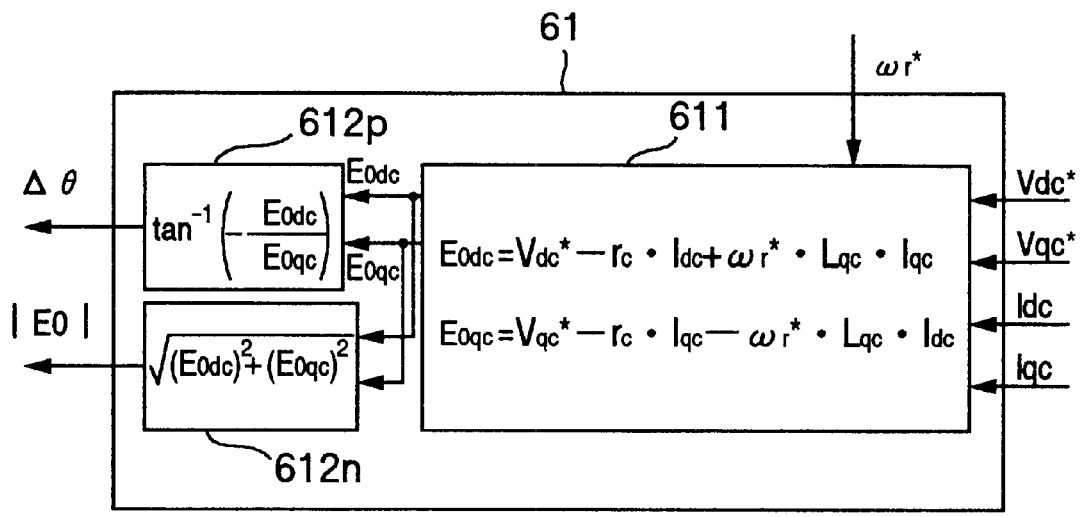
FIG. 8 is a block diagram showing the contents of computation in an induced voltage/axis shift estimating operation unit.

Operation in the individual components will now be described in greater detail. A block diagram of FIG. 7 is useful in explaining the contents of computation in the coordinate converter 41. Detection currents iu and iw delivered out of the motor current detector 32 and phase θdc delivered out of the speed phase estimating unit 62 are inputted to a coordinate conversion operating section 411. In the operating section 411, observation currents Idc and Iqc on the dc-qc coordinate axis are computed in accordance with equation (24).

$$I_{dc} = i_\alpha \cdot \cos\theta_{dc} + i_\beta \cdot \sin\theta_{dc} \quad (24)$$

$$I_{qc} = -i_\alpha \cdot \sin\theta_{dc} + i_\beta \cdot \cos\theta_{dc}$$

$$\text{where, } i_\alpha = j u,$$

$$i_\beta = -\frac{i_u + 2 \cdot i_w}{\sqrt{3}}$$

The detection currents iu and iw of the motor 2 contain switching ripple and noise components. Then, in the coordinate converter 41, filters 412 and 413 act on a result of computation pursuant to equation (24) to eliminate the aforementioned component from the observation currents on the dc-qc coordinate axis. Accordingly, time constants of the filters 412 and 413 are set to predetermined values conforming to the switching frequency of the inverter and circuit specifications of the motor current detector 32.

Next, the speed controller 51 will be described. In connection with speed command ωr* and estimation speed ωr_det delivered out of the speed phase estimating unit 62, a difference (ωr*)-ωr_det is computed by an adder 50 and inputted to the speed controller 51. The speed controller 51 computes a torque command τr* for causing the ωr_det to follow the ωr* and delivers the command. Receiving an input of the torque command τ*, the current command generator 52 determines dc axis current command value Idc* and qc axis current command value Iqc* and delivers them. These command values are so determined as to minimize a predetermined evaluation function in accordance with the operation condition.

The d axis current command value Idc* delivered out of the current command generator 52 and the d axis current Idc delivered out of the coordinate converter 41 are inputted to an adder 53 and a difference between them is computed. The d axis current controller 42d computes a compensation voltage for causing the value of (Idc*)-Idc to be zero and delivers d axis compensation voltage VId. The current command generator 52 delivers q axis current command Iqc* and the coordinate converter 41 delivers q axis current Iqc. These command and current are inputted to an adder 54 and a difference between them is computed. The q axis current controller 42q computes a compensation voltage for causing the value of (Iqc*)-Iqc to be zero and q axis compensation voltage VIq is delivered. Further, d axis current command value Idc*, q axis current command value Iqc* and speed command ωr* are inputted to the current feed-forward compensator 43 and d axis model voltage Vdm* and q axis model voltage Vqm* are delivered. These motor voltage models are expressed by equation (25) by using Id*, Iq* and ωr*.

$$V_{dm}^* = r_c I_d^* - \omega_r^* L_{qc} I_q^*$$

$$V_{qm}^* = \omega_r^* L_{dc} I_d^* + r_c I_q^* + k_{Ec} \omega_r^* \quad (25)$$

The motor voltage models of equation (25) are derived from equation (2) and in these models, the current change term in equation (2) is omitted, voltage and current are all replaced with command values and motor constants are all replaced with setting values. Besides, when the motor 2 is driven without undergoing step-out, the rotation speed ω1 of the control axis is considered as being substantially equal to the speed command value ωr* and hence ω1 is replaced with ωr*.

The sum of d axis compensation voltage VId and d axis model voltage Vdm* is computed by means of an adder 55 and a dc axis voltage Vdc* is delivered to the inverter 44. Further, the sum of q axis compensation voltage VIq and q axis model voltage Vqm* is computed by means of an adder 56 and a qc axis voltage command Vqc* is delivered to the inverse converter 44.

The inverter 44 receives the voltage commands Vdc* and Vqc* on the control axis to generate a three-phase voltage command. More specifically, by using inputs of the dc axis voltage command Vdc* and qc axis voltage command Vqc*, three-phase voltage commands Vu*, Vv* and Vw* are computed in accordance with equation (26).

$$V_u^* = V_\alpha^* \quad (26)$$

$$V_v^* = V_\alpha^*\left(-\cos\frac{\pi}{3}\right) + V_\beta^*\left(\cos\frac{\pi}{6}\right)$$

$$V_w^* = V_\alpha^*\left(-\cos\frac{\pi}{3}\right) + V_\beta^*\left(\cos\frac{\pi}{6}\right)$$

$$\text{where } V_\alpha^* = V_{dc}^* \cdot \cos\theta_{dc} - V_{qc}^* \cdot \sin\theta_{dc}$$

$$V_\beta^* = V_{dc}^* \cdot \sin\theta_{dc} + V_{qc}^* \cdot \cos\theta_{dc}$$

The pulse width modulator 45 is a modulation means for performing known pulse width modulation. As necessary, the voltage detector 31 detects a voltage Edc of the DC voltage unit.

Next, the induced voltage/axis shift estimation-operating unit 61 will be described. An embodiment of the induced voltage estimation/axis shift operating unit is depicted, in block form, in FIG. 8. The induced voltage/axis shift estimation operating unit 61 computes an axis shift Δθ in the dc-qc coordinate system representing the control axis and delivers an estimated value.

In the induced voltage/axis shift estimation operating section 611, dc axis component E0dc and qc axis component E0 qc of induced voltage on the dc-qc coordinate axis are computed from the observation currents Idc and Iqc, voltage commands Vdc* and Vqc* and speed command ωr* pursuant to equation (27).

$$E_{0dc} = V_{dc}^* - r_c \cdot I_{dc} + \omega_r \cdot L_{qc}^* \cdot I_{qc}$$

$$E_{0qc} = V_{qc}^* - r_c I_{qc} + \omega_r^* \cdot L_{qc} \cdot I_{dc} \qquad (27)$$

Equation (27) is derived from equation (17) and in this equation, voltages in equation (17) are replaced with command values and motor constants (such as r, Lq) are all replaced with setting values. When the motor is driven without undergoing step-out, the rotation speed of the control axis (frequency of motor applied voltage) ω1 is considered as being substantially equal to the speed command value ωr* and ω1 is replaced with ωr*. As the ω1, that determined from the axis shift Δθ by means of the speed phase estimating unit 62 may be used.

In connection with the induced voltage estimated by the operating section 611, a phase of an induced voltage vector as viewed from the qc axis is computed and an estimation value of axis shift Δθ is computed by means of an operating section 612p. Further, the magnitude |E0| of the determined induced voltage vector is computed by an operating section 612n and is delivered.

Figure 9:
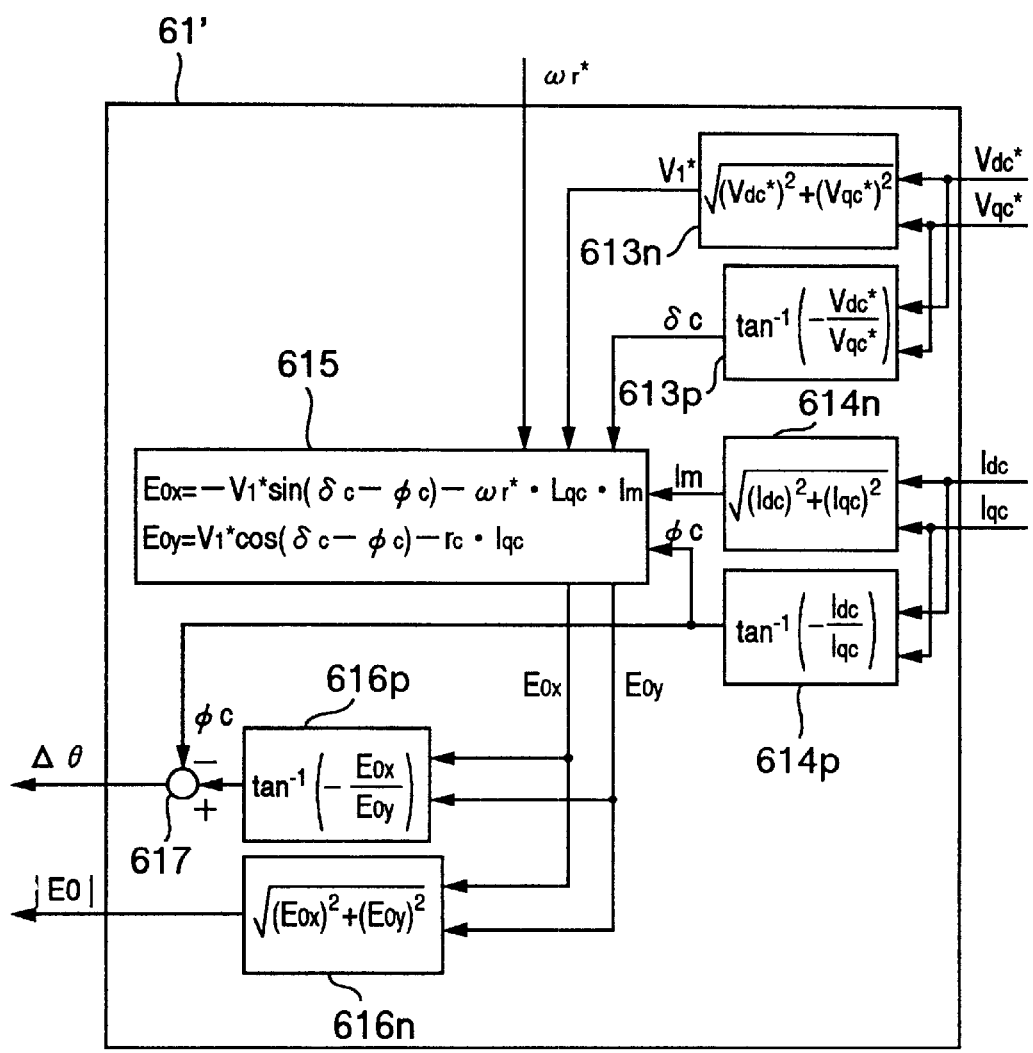
FIG. 9 is a block diagram showing the contents of computation in another embodiment of the induced voltage/axis shift estimating operation unit.

Referring now to FIG. 9, there is illustrated another embodiment of the induced voltage/axis shift estimation-operating unit. An induced voltage/axis shift estimation operating unit 61' computes an axis shift Δθ by using the current axis as a reference. In connection with voltage commands Vdc* and Vqc*, magnitude V1* of the voltage commands and a phase δc of a voltage vector as viewed from the qc axis are computed by means of operating sections 613n and 613p. Similarly, in connection with the detection currents Idc and Iqc, magnitude Im of the currents and a phase φc of a current vector as viewed from the qc axis are computed by means of operating sections 614n and 614p. From the thus obtained values of V1*, δc, Im and φc, an operating section 615 computes an induced voltage pursuant to equation (28).

$$E_{0x} = -V_1^* \sin(\delta_c - \phi_c) - \omega_r^* I_{qc} \cdot I_m$$

$$E_{0y} = V_1^* \cos(\delta_c - \phi_c) - r_c \cdot I_m \qquad (28)$$

Equation (28) is derived from equation (23) and in this equation, E0x represents a component orthogonal to-the current axis and E0y represents a component in the current direction. In connection with the estimated induced voltage E0, a phase φm of the current axis as viewed from the phase of the induced voltage vector by means of an operating section 616p. An operating section 617 determines an axis shift Δθ from a difference between the phase φm of current axis as viewed from the induced voltage vector and the phase φc of current vector as viewed from the qc axis. Further, magnitude |E0| of the obtained induced voltage vector E0 is delivered out of an operating section 616n.

As described above, in the present embodiment, the induced voltage/axis shift estimation operating unit 61 (61') adjusts the inverter output frequency ω1 on the basis of the estimated axis shift Δθ. When the axis shift Δθ is positive during motor forward rotation, the control axis phase θdc leads the real axis phase θd and therefore, the inverter frequency ω1 is decreased to decelerate the rotation of the control axis. Conversely, when the axis shift Δθ is negative during motor forward rotation, the control axis phase θdc lags the real axis phase θd and therefore, the inverter frequency ω1 is increased to accelerate the rotation of the control axis.

The inverter frequency ω1 determined in the manner as above is integrated to provide a control axis phase θdc. A high-frequency change component is removed from the inverter frequency ω1 to provide a motor estimation value used for the speed control system. Through this, a speed control system for the synchronous motor without using a speed sensor can be provided.

Figure 10:
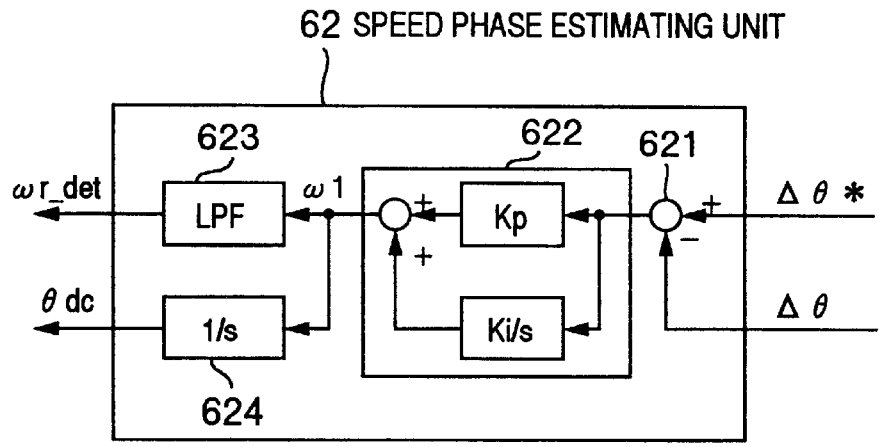
FIG. 10 is a block diagram showing the contents of computation in a speed phase estimating unit.

Referring now to FIG. 10, an embodiment of the speed phase estimating unit 62 will be described. A difference between the axis shift Δθ estimated by the induced voltage/ axis shift estimation operating unit 61 and the axis shift error compensating value Δθ* delivered out of the axis shift error compensator 7 is calculated by means of an adder 621. The output of the adder 621 is inputted to a PI compensator 622. The PI compensator 622 operates the inverter output frequency ω1 to cause the Δθ to follow the Δθ*. A means having the same function, other than the PI compensator, may otherwise be used.

With this construction, since the influence of the parameter error contained in the computation result of axis shift Δθ can be compensated, an excellent control system without position sensor for the synchronous motor that is freed from step-out even when the parameter error is large can be provided.

An output of the PI compensator 622 constantly changes because of the adjustment of the axis shift Δθ and contains a high-frequency component. Accordingly, when the output of the PI compensator 622 is used as a detection speed of the motor so as to control the motor speed, the speed control characteristic is degraded. Thus, in the present embodiment, the high-frequency component is removed from the ω1 by means of a low-pass filter 623 to deliver a motor speed estimation value ωr_det. In addition, an integrator 624 integrates the inverter output frequency ω1 to deliver a phase θdc.

Figure 11:
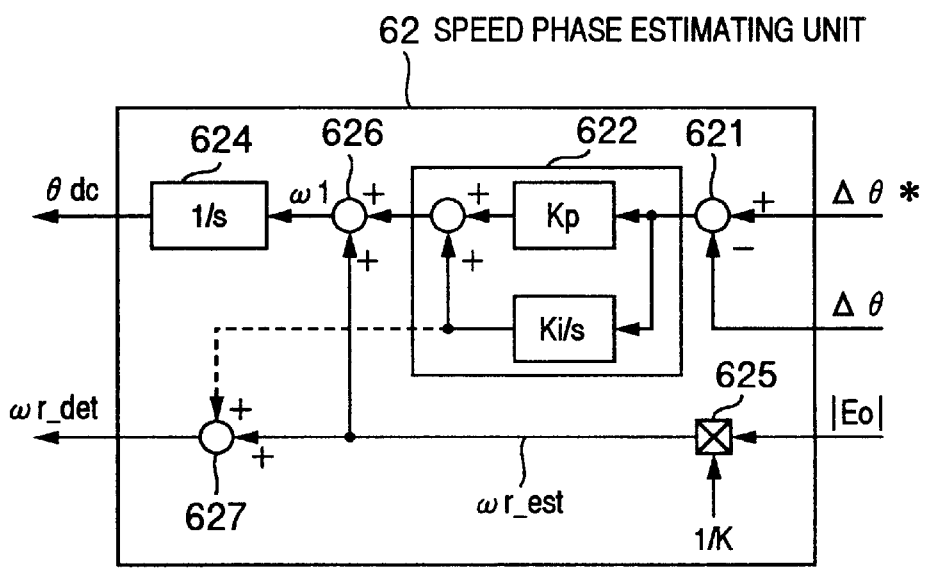
FIG. 11 is a block diagram showing the contents of computation in another embodiment of the speed phase estimating unit.

Referring now to FIG. 11, there is illustrated another embodiment of the speed phase estimating unit 62. In the embodiment, with a view to improve the responsibility of the inverter output frequency ω1, a means for estimating a speed from the magnitude |E0| of induced voltage is added to the embodiment shown in FIG. 10. Gathering from equation (9), the magnitude |E0| of induced voltage determined by the induced voltage/axis shift estimation operating unit 61 can be expressed by equation (29).

$$|E_0| = k_E \omega_r + \omega_r (L_d - L_q) \cdot I_d + (L_q - L_d) \cdot pI_q \qquad (29)$$

With the current change term in equation (29) neglected, the magnitude of induced voltage is proportional to motor speed ωr, so that the motor speed can be estimated by dividing the magnitude by an induced voltage coefficient k indicated by equation (30).

$$k = k_{EC} + (L_{dc} - L_{qc}) \cdot I_d \qquad (30)$$

Here, KEC represents a setting value of induced voltage constant and Ldc and Lqc represent setting values of inductance. Further, Id can be determined from the observation currents Idc and Iqc on the control axis and the axis shift Δθ in accordance with equation (3).

In FIG. 11, the magnitude |E0| of induced voltage and the induced voltage coefficient k in equation (30) are inputted to an integrator 625. In the integrator 625, |E0|/k is computed and a speed ωr_est estimated from the induced voltage is delivered. In an adder 626, an output of the PI compensator 622 and the ωr_est are added together and an inverter output frequency ω1 is delivered. With this construction, a shift of ωr_est from the real speed is compensated by means of the PI compensator 622 and so, the responsibility can be improved by adjusting the control gain.

In addition, in an adder 627, the sum of ω_est and an output of PI compensator 622 removed of high-frequency components is computed and a motor estimation speed ωr_det is delivered. In the embodiment of FIG. 11, an integrator output is taken out as a quantity resulting from removal of the high-frequency components from the output of the PI compensator 622. This is because the parameter setting value in the controller has an error and an error contained in ωr_est is to be compensated.

Incidentally, in the operation result of the axis shift $\Delta\theta$ in the induced voltage/axis shift estimation operating unit 61, a steady axis shift $\Delta\theta e$ due to the parameter error remains. On the other hand, in order for the current command generator 52 to deliver torque conforming to a command value, current command values Idc* and Iqc* are computed in accordance with a value of $\tau^*$. In the presence of the steady axis shift $\Delta\theta e$, however, a current conforming to the command value does not flow on the real axis to decrease torque generated. As a result, the speed is decreased to thereby causing the speed controller 51 to increase the torque command $\tau^*$ and eventually, the magnitude of the current command values increases. Conversely, when the phases of the real axis and control axis coincide with each other to cause a current conforming to the command values, the torque command value $\tau^*$ is minimized and the magnitude Im of motor current is also minimized.

The axis shift error compensator 7 in the present embodiment is a means for compensating the influence of an error when the parameter setting value of the controller has the error. By substituting a value to $\Delta\theta^*$ usually set to zero, the axis shift between the real axis and the control axis can be given by the sum of the axis shift $\Delta\theta e$ due to the parameter error and the axis shift error compensation value $\Delta\theta^*$. Then, by adjusting the axis shift error compensation value $\Delta\theta^*$ such that the motor current Im is minimized and making zero the $\Delta\theta^* + \Delta\theta e$, the real axis can coincide with the control axis.

Figure 12:
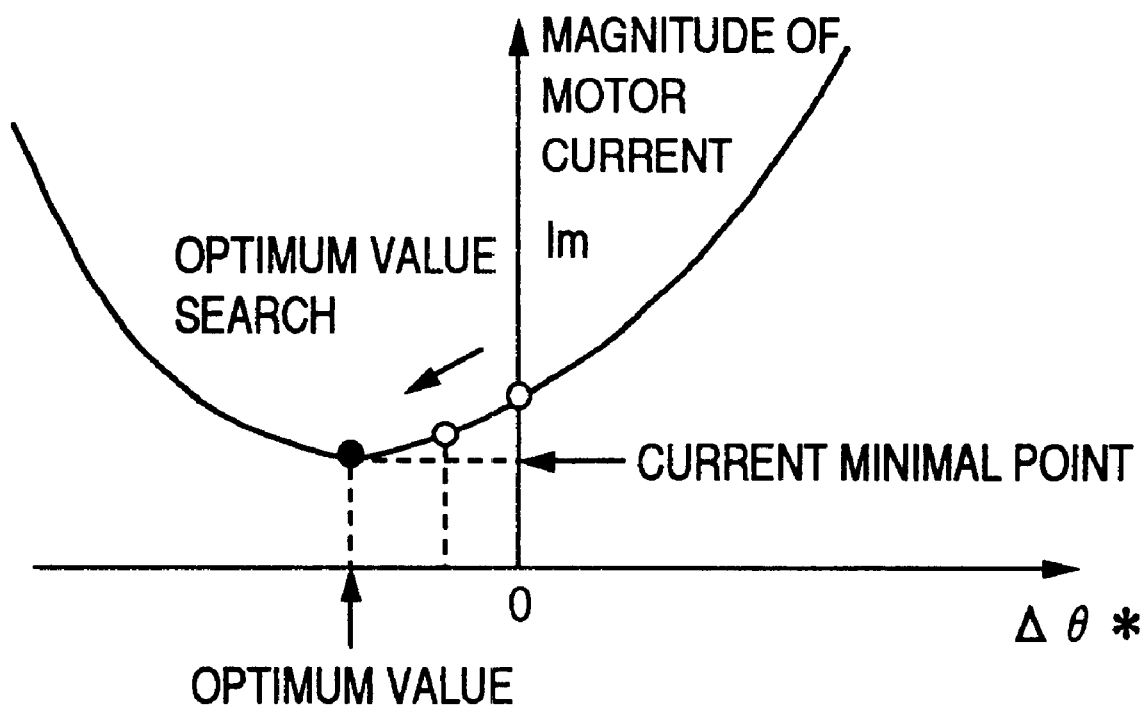
FIG. 12 is a diagram for explaining a method of adjusting the current phase to an optimum condition by means of an axis shift error compensation unit.

Referring now to FIG. 12, a method of adjusting the axis shift error compensation value $\Delta\theta^*$ will be described. It is assumed that during an i-th control period, a value is set to the axis shift error compensation value $\Delta\theta^*$ and the magnitude of motor current is Im(i). Next, it is assumed that during an (i+1)th control period, a randomly selected value is substituted to $\Delta\theta^*$ and as a result, the magnitude of motor current is changed to Im(i+1). If Im(i+1) is smaller than Im(i), the setting value used during (i+1)th control period is selected as Id* or $\Delta\theta^*$. By repeating the above operation, a setting value that minimizes the motor current Im can be determined.

As described above, according to the present embodiment, when the rotor position is estimated from the phase of an induced voltage of the salient-pole machine, on the basis of the fact that the induced voltage of the salient-pole machine can be obtained by subtracting a voltage drop across the resistor and a voltage drop across the inductance from a motor applied voltage, the concept of a virtual voltage independent of the rotor position substituting for the inductance voltage drop dependent on the rotor position is introduced and besides, the vector relation that does not cause the phase of the induced voltage to change by using the motor constant Lq as the inductance is derived, thereby ensuring that the phase of the induced voltage can be estimated correctly on the basis of observable quantities.

The vector in the voltage relation of salient-pole machine in which the concept of the virtual voltage drop is introduced can stand when either the control axis is used as a reference or the current axis is used as a reference and therefore, the phase of the induced voltage can be estimated by values observable from the control axis or the current axis.

In the present embodiment, the method for estimating the axis shift angle $\Delta\theta$ on the basis of equation (17) or (23) has been described but by using equation (16), the axis shift $\Delta\theta$ can be estimated similarly. In this case, in connection with the virtual voltage drop, differential components of observation currents Idc and Iqc are taken into consideration. In computation of the differential term of the observable current, a vector relation not causing the phase of the induced voltage to change can be introduced by using the inductance constant Ld so that the phase of the induced voltage may be estimated correctly on the basis of observable values.

In this manner, by using the concept of the virtual voltage drop, the phase of the induced voltage of salient-pole machine can be estimated from observable quantities without resort to position sensor and the axis shift $\Delta\theta$ can be computed with high accuracy directly from the estimated phase, with the result that an excellent control system for synchronous motor without resort to position sensor can be provided which can be stable and free from step-out even when a large axis shift occurs during, for example, an abrupt load change or abrupt accelerating/decelerating operation.

Further, according to the present embodiment, in order to decrease the estimation error $\Delta\theta$ due to the error of the parameter setting value in the axis shift estimation equations (equations (16), (17) and (23)), the concept of the axis shift error compensation value $\Delta\theta^*$ is introduced and the frequency ω1 of motor applied voltage or torque command value $\tau^*$ is so modified as to make zero the $\Delta\theta^* - \Delta\theta$. In this case, by taking advantage of the fact that the motor current is minimized when the phases of the real axis and control axis coincide with each other, the setting value of $\Delta\theta^*$ is so tuned as to minimize the motor current in a stable condition of the motor.

In the foregoing embodiments, the salient synchronous motor using the permanent magnet has been handled. As a salient synchronous motor not using a magnet, a synchronous reluctance motor is known. As well known in the art, a voltage equation of the synchronous reluctance motor has a format in which KE term in the voltage equation (2) of the permanent magnet synchronous motor is made to be zero. On the other hand, the axis shift estimation equations (17) and (23) derived in the present invention do not use the induced voltage constant KE in the operation. Besides, reduction depending on KE is not effected in derivation of these equations. Accordingly, even to the synchronous reluctance motor, the estimation method of axis shift $\Delta\theta$ and the control method without resort to position sensor according to the invention can be applied.

What is claimed is:

1. A method of estimating a rotor position of a synchronous motor comprising the steps of:

when estimating an induced voltage of the synchronous motor having saliency from a vector difference between a motor applied voltage and voltage drops due to resistance and inductance of a motor winding, using a predetermined value as said inductance to determine said voltage drop due to inductance as a quantity dephased by a predetermined amount from a motor current; and calculating the phase of the induced voltage from the estimated induced voltage to estimate the rotor position.

2. A synchronous motor rotor position estimating method according to claim 1, wherein said voltage drop due to inductance has a vector 90° leading said motor current, an inductance (Lq) representing a motor electrical constant of salient-pole machine is used as said predetermined value, and said voltage drop due to inductance is determined by the product of said inductance (Lq), observable magnitude of said motor current and observable frequency of the motor applied voltage or motor speed command value.

3. A synchronous motor rotor position estimating method according to claim 1 or 2, wherein said motor current is acquired in the form of observation values of two axis components referenced to control axes (dc-qc) of a rotary coordinate system, an observation value of said motor applied voltage, a voltage drop determined by the product of an observation value of said current and said resistance and a voltage drop determined by the product of the observation value of said current and said inductance are computed in respect of axis components of said control axis to calculate said vector difference in terms of axis components, and the phase of said induced voltage is determined by a ratio of the calculated vector difference between the two axis components.

4. A synchronous motor rotor position estimating method according to claim 1 or 2, wherein said motor current is acquired as observable magnitude of motor current, said motor applied voltage, said voltage drop due to resistance and said voltage drop due to inductance are computed in terms of components of the current axis and components 90° leading said current axis to calculate said vector difference in terms of the components, and the phase of said induced voltage is determined by a ratio of the calculated vector difference between the two axis components.

5. A synchronous motor rotor position estimating method comprising the steps of:
when estimating an induced voltage of the synchronous motor having saliency on the basis of the fact that the induced voltage has a vector relation resulting from subtraction of voltage drops due to resistance and inductance of a motor winding from a motor applied voltage, determining said voltage drop due to inductance from a virtual voltage drop representing a quantity 90° leading a motor current by using a predetermined value as said inductance; and
calculating a phase of the induced voltage from an induced voltage estimated by using said virtual voltage drop to estimate the rotor position.

6. A synchronous motor rotor position estimating method according to claim 5, wherein the induced voltage estimated by using said virtual voltage drop is a virtual induced voltage having the same phase as that obtained without using said virtual voltage drop and being changeable in magnitude to maintain said vector relation, and said phase of the virtual induced voltage is calculated to estimate said rotor position.

7. A synchronous motor rotor position estimating method comprising the steps of:
when estimating an induced voltage of the synchronous motor having saliency from a vector difference between a motor applied voltage and voltage drops due to resistance and inductance of a motor winding, using a predetermined value as said inductance and determining said voltage drop due to inductance as the sum of a quantity dephased by a predetermined amount from a motor current and a quantity generated by changes in the magnitude and phase of the motor current; and
calculating a phase of the induced voltage from an estimated induced voltage to estimate the rotor position.

8. A synchronous motor rotor position estimating method according to claim 7, wherein said voltage drop due to inductance has a vector 90° leading said motor current, inductances (Lq, Ld) representing motor electrical constants of salient-pole machine are used as said predetermined value, and said voltage drop due to inductance is determined from the product of the inductance (Lq), observable magnitude of said motor current and observable frequency of the motor applied voltage or motor speed command value, the product of the inductance (Ld) and a quantity generated by changes in observable magnitude and phase of the motor current, and the sum of these products.

9. A method of estimating a rotor position of a synchronous motor having saliency and controlling the synchronous motor without resort to position sensor, comprising the steps of:
when estimating an induced voltage of said synchronous motor from a vector difference between a motor applied voltage and voltage drops due to resistance and inductance of a motor winding, using a predetermined value as said inductance and determining said voltage drop due to inductance as a quantity leading a motor current by a predetermined phase; and
determining a phase of an estimated induced voltage and on the basis of the fact that this phase indicates an axis shift angle between a virtual rotor position from the control viewpoint and an unobservable actual rotor position, decreasing a frequency of the motor applied voltage to decrease the rotation speed of the virtual rotor position when an axis shift angle estimated from the phase of said induced voltage indicates that the virtual rotor position leads the actual rotor position in the rotation direction of the rotor and increasing the frequency of the motor applied voltage to increase the rotation speed of the virtual rotor position when the estimated axis shift angle indicates lagging.

10. A method of estimating a rotor position of a synchronous motor having saliency and controlling the synchronous motor without resort to position sensor, comprising the step of:
when estimating an induced voltage of said synchronous motor from a vector difference between a motor applied voltage and voltage drops due to resistance and inductance of a motor winding, using a predetermined value as said inductance and determining said voltage drop due to inductance as a quantity leading a motor current by a predetermined phase; and
determining a phase of an estimated induced voltage and on the basis of the fact that the phase indicates an axis shift angle between a virtual rotor position from the control viewpoint and an unobservable actual rotor position, increasing a torque command value for the motor to increase the rotation speed of the actual rotor position when the axis shift angle estimated from the phase of said induced voltage indicates that the virtual rotor position leads the actual rotor position in the rotation direction of the rotor and decreasing the torque command value for the motor to decrease the rotation speed of the actual rotor position when the estimated axis shift angle indicates lagging.

11. A synchronous motor controlling method without resort to position sensor according to claim 9 or 10, wherein said voltage drop due to inductance has a vector 90° leading said motor current, an inductance (Lq) representing a motor electrical constant of salient-pole machine is used as said predetermined value, and said voltage drop due to inductance is determined by the product of said inductance (Lq), observable magnitude of said motor current and observable frequency of the motor applied voltage or motor speed command value.

12. A synchronous motor controlling method without resort to position sensor according to claim 11, wherein an error compensation value of the axis shift angle indicated by said phase of induced voltage is set and said frequency of motor applied voltage or said torque command value is so controlled as to minimize the difference between said axis shift angle and said error compensation value.

13. A synchronous motor controlling method without resort to position sensor according to claim 12, wherein setting of said error compensation value is so adjusted as to minimize said motor current under a condition that the rotation speed and the load on said motor are constant.

14. A synchronous motor controlling method without resort to position sensor according to claim 9 or 10, wherein an error compensation value of the axis shift angle indicated by said phase of induced voltage is set and said frequency of motor applied voltage or said torque command value is so controlled as to minimize the difference between said axis shift angle and said error compensation value.

15. A synchronous motor controlling method without resort to position sensor according to claim 14, wherein setting of said error compensation value is so adjusted as to minimize said motor current under a condition that the rotation speed and the load on said motor are constant.

16. A synchronous motor controlling method without resort to position sensor according to claim 9 or 10, wherein said voltage drop due to inductance is determined, using a predetermined value as said inductance, as a sum of a quantity dephased by a predetermined amount from a motor current and a quantity generated by changes in the magnitude and phase of the motor current.

17. A synchronous motor controlling method without resort to position sensor according to claim 16, wherein an error compensation value of the axis shift angle indicated by said phase of induced voltage is set and said frequency of motor applied voltage or said torque command value is so controlled as to minimize the difference between said axis shift angle and said error compensation value.

18. A synchronous motor controlling method without resort to position sensor according to claim 17, wherein setting of said error compensation value is so adjusted as to minimize said motor current under a condition that the rotation speed and the load on said motor are constant.

19. A system of controlling a synchronous motor without resort to position sensor, comprising:
an inverter for converting a DC voltage into a three-phase AC voltage of variable voltage and variable frequency and applying the three-phase AC voltage to the synchronous motor having saliency;
a current detector for detecting a motor current;
a voltage command operating unit for preparing voltage command values by using a virtual rotor position ($\theta$dc) in order that the magnitude and phase of detected three-phase motor current follow command values of the magnitude and phase of the motor current, respectively;
a current command generating unit applied with a motor speed command value to prepare said command values of the magnitude and phase of motor current on the basis of the motor speed command value and a motor speed estimation value;
an induced voltage estimating unit for estimating an induced voltage of said motor by using the detected motor current, said voltage command value and said motor speed command value as well as resistance and inductance of motor parameters, estimating an axis shift angle ($\Delta\theta$) indicative of a shift between the virtual rotor position from the control viewpoint and a real position and delivering the axis shift angle; and
a speed phase estimating unit for determining the motor speed estimation value and the virtual rotor position ($\theta$dc) from the axis shift angle ($\Delta\theta$) and delivering the motor speed estimation value and the virtual rotor position ($\theta$dc).

20. A system of controlling a synchronous motor without resort to position sensor, comprising:
an inverter for converting a DC voltage into a three-phase AC voltage of variable voltage and variable frequency and applying the three-phase AC voltage to the synchronous motor;
a current detector for detecting a motor current;
a voltage command operating unit for preparing voltage commands by using a virtual rotor position ($\theta$dc) in order that the magnitude and phase of detected three-phase motor current follow command values of the magnitude and phase of the motor current, respectively;
a current command generating unit applied with a motor speed command value to prepare said command values of the magnitude and phase of motor current on the basis of the motor speed command value and a motor speed estimation value;
an induced voltage estimating unit for estimating an induced voltage of said motor by using the detected motor current, said voltage command values and a frequency of motor applied voltage as well as resistance and inductance of motor parameters, estimating an axis shift angle ($\Delta\theta$) indicative of a shift between the virtual rotor position from the control viewpoint and a real position and delivering the axis shift angle; and
a speed phase estimating unit for computing the frequency of motor applied voltage from the axis shift angle ($\Delta\theta$) to deliver the computed frequency of motor applied voltage, and determining the motor speed estimation value and the virtual rotor position ($\theta$dc) from the computed frequency of motor applied voltage to deliver the motor speed estimation value and the virtual rotor position ($\theta$dc).

21. A synchronous motor controlling system without resort to position sensor according to claim 19 or 20, wherein said induced voltage estimating unit includes operating means for dividing said induced voltage to calculate its dc axis and qc axis components on a rotary coordinate system (dc-qc axis), and operating means for calculating the axis shift angle ($\Delta\theta$) from a ratio between the dc axis and qc axis components of the induced voltage, and said dc axis component of the induced voltage is determined by subtracting the product of said resistance and current (Idc) and the product of said inductance and current as well as said speed command value from the dc axis voltage command value, and said qc axis component of the induced voltage is determined by subtracting the product of said resistance and current (Iqc) and the product of a predetermined value of said inductance and current (Idc) as well as said speed command value from the qc axis voltage command value.

22. A synchronous motor control system without resort to position sensor according to claim 21, further comprising an error compensating unit for applying an error compensation value of said motor parameter to an estimated value of axis shift angle ($\Delta\theta$), wherein said speed phase estimating unit computes the inputted axis shift angle ($\Delta\theta$) to cause it to follow said error compensation value and delivers said motor speed estimation value.

23. A synchronous motor control system without resort to position sensor according to claim 19 or 20, further comprising an error compensating unit for applying an error compensation value of said motor parameter to an estimated value of axis shift angle (Δθ), wherein said speed phase estimating unit computes the inputted axis shift angle (Δθ) to cause it to follow said error compensation value and delivers said motor speed estimation value.

24. A system of controlling a synchronous motor having saliency without resort to position sensor, comprising:

induced voltage estimating means for estimating an induced voltage vector of the motor on a virtual rotary coordinate system (rotary coordinate system from the control viewpoint) having virtual flux axis (dc axis) and qc axis leading the dc axis by 90° in electrical angle and determining a phase angle of the induced voltage vector relative to the qc axis; and speed control means for using said estimated phase angle as a shift quantity between the qc axis and a real flux axis of the motor to control a frequency of motor applied voltage or a torque command value such that the shift quantity is decreased.

* * * * *